US012669686B2

(12) United States Patent
Lee et al.

(10) Patent No.: US 12,669,686 B2
(45) Date of Patent: Jun. 30, 2026

(54) CAMERA MODULE WITH REFLECTIVE AND REFRACTIVE MEMBER AND ELECTRONIC DEVICE INCLUDING THE SAME

(71) Applicant: SAMSUNG ELECTRONICS CO., LTD., Suwon-si (KR)

(72) Inventors: Yongjae Lee, Suwon-si (KR); Haneung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 18/370,671

(22) Filed: Sep. 20, 2023

(65) Prior Publication Data

US 2024/0094515 A1     Mar. 21, 2024

Related U.S. Application Data

(63) Continuation of application No. PCT/KR2023/014316, filed on Sep. 20, 2023.

(30) Foreign Application Priority Data

Sep. 20, 2022   (KR) ......................... 10-2022-0118722
Nov. 16, 2022   (KR) ......................... 10-2022-0153925

(51) Int. Cl.
*H04N 5/335* (2011.01)
*G02B 13/00* (2006.01)
(Continued)

(52) U.S. Cl.
CPC ........... *G02B 13/007* (2013.01); *H04N 23/55* (2023.01); *H04N 23/57* (2023.01); *H04N 23/687* (2023.01)

(58) Field of Classification Search
CPC ...................................................... G03B 17/17
See application file for complete search history.

(56) References Cited

U.S. PATENT DOCUMENTS 7,616,393 B2 * 11/2009 Border ................. G02B 17/086
359/837
11,933,949 B2 * 3/2024 Saiga .................. G02B 17/0816
(Continued)

FOREIGN PATENT DOCUMENTS

CN       110062071 A     7/2019
CN       108540704 B     3/2020
(Continued)

OTHER PUBLICATIONS

International Search Report (PCT/ISA/210) issued Dec. 20, 2023 by the International Searching Authority in International Patent Application No. PCT/KR2023/014316.
(Continued)

*Primary Examiner* — Gary C Vieaux
(74) *Attorney, Agent, or Firm* — Sughrue Mion, PLLC

(57) ABSTRACT

An electronic device includes at least one lens, an image sensor aligned along an optical axis from the at least one lens, and a reflective and refractive member disposed between the at least one lens and the image sensor on the optical axis. The reflective and refractive member includes an incident surface on which light passing through the at least one lens is incident, a first reflective surface inclined with respect to the incident surface, and a second reflective surface inclined with respect to the incident surface and spaced apart from the first reflective surface. First and second cutting planes are inclined with respect to the incident surface and face first and second directions, respectively.

13 Claims, 22 Drawing Sheets

(51) Int. Cl.
   *H04N 23/55*        (2023.01)
   *H04N 23/57*        (2023.01)
   *H04N 23/68*        (2023.01)

(56)                References Cited

U.S. PATENT DOCUMENTS

| | | | |
|---|---|---|---|
| 2008/0062531 A1 | 3/2008 | Kim et al. | |
| 2012/0075726 A1 | 3/2012 | Takakubo et al. | |
| 2016/0062136 A1* | 3/2016 | Nomura | H04N 23/60 |
| | | | 359/557 |
| 2021/0048649 A1 | 2/2021 | Goldenberg et al. | |
| 2021/0048665 A1* | 2/2021 | Nakamura | G02B 5/003 |
| 2021/0096338 A1 | 4/2021 | Saiga | |
| 2021/0165192 A1 | 6/2021 | Shabtay et al. | |
| 2021/0266433 A1* | 8/2021 | Chang | G02B 7/021 |
| 2021/0333516 A1 | 10/2021 | Li et al. | |
| 2021/0366968 A1 | 11/2021 | Carrion et al. | |
| 2022/0091373 A1 | 3/2022 | Saiga et al. | |
| 2022/0163706 A1* | 5/2022 | Feldman | G02B 13/0065 |
| 2022/0196993 A1 | 6/2022 | Liao et al. | |
| 2023/0176265 A1 | 6/2023 | Xu et al. | |
| 2024/0069409 A1 | 2/2024 | Seo | |

FOREIGN PATENT DOCUMENTS

| | | | | | |
|---|---|---|---|---|---|
| JP | 2006-154705 | A | 6/2006 | | |
| JP | 2010-164841 | A | 7/2010 | | |
| KR | 10-0799218 | B1 | 1/2008 | | |
| KR | 10-0934719 | B1 | 12/2009 | | |
| KR | 10-2019-0022522 | A | 3/2019 | | |
| KR | 10-2020-0012611 | A | 2/2020 | | |
| KR | 10-2020-0131836 | A | 11/2020 | | |
| KR | 10-2021-0035516 | A | 4/2021 | | |
| KR | 10-2023-0050211 | A | 4/2023 | | |
| WO | 2021/062055 | A1 | 4/2021 | | |
| WO | WO-2022030292 | A1 * | 2/2022 | | G01M 11/00 |
| WO | 2022/145992 | A1 | 7/2022 | | |

OTHER PUBLICATIONS

Written Opinion (PCT/ISA/237) issued Dec. 20, 2023 by the International Searching Authority in International Patent Application No. PCT/KR2023/014316.

Communication issued on Aug. 25, 2025 from the European Patent Office in European Patent Application No. 23868599.4.

* cited by examiner

CAMERA MODULE WITH REFLECTIVE AND REFRACTIVE MEMBER AND ELECTRONIC DEVICE INCLUDING THE SAME

CROSS-REFERENCE TO RELATED APPLICATIONS

This application is a continuation application of International Application No. PCT/KR2023/014316, filed on Sep. 20, 2023, which claims priority to Korean Patent Application No. 10-2022-0118722, filed on Sep. 20, 2022, in the Korean Intellectual Property Office, and to Korean Patent Application No. 10-2022-0153925, filed on Nov. 16, 2022, in the Korean Intellectual Property Office, the disclosures of which are incorporated by reference herein in their entireties.

BACKGROUND

1. Field

The disclosure relates to optical devices, and more particularly to, a camera module and an electronic device including the camera module.

2. Description of Related Art

Optical devices such as, cameras capable of capturing images and/or videos, have been widely used. Conventional film-type cameras are being recently replaced with digital cameras or video cameras with a solid image sensor, such as charge coupled device (CCD) or complementary metal-oxide semiconductor (CMOS) because Solid image sensor (CCD or CMOS)-adopted cameras may easily save, copy, or move images as compared with film-type cameras and have thus been replacing film-type cameras.

As a consumption model of cameras shifts from compact standalone cameras to camera modules embedded in mobile devices (e.g., smart phones), increasing miniaturization while maintaining image quality may have emerged as a constraint. Relatively high image quality may be realized by a camera with a large optical lens system and a large imaging plane (e.g., image sensor). Accordingly, high image quality and miniaturization may be in an opposing (trade-off) relationship. Related attempts to address this trade-off may include employing multiple single-focus lens-type camera modules in one electronic device.

For example, in such attempts, a zooming effect may be created by making each single-focus lens-type camera module have a different focal length and properly mixing with digital zoom. Camera modules that may adopt this approach may include wide cameras (e.g., ultra-wide cameras) that may have a shorter focal length than a camera having a focal length of 24 to 35 millimeters (mm), and cameras (e.g., tele cameras) that may have a longer focal length than a 35 mm camera optical lens system. Among the camera modules, a tele camera that may have a relatively long (e.g., three times longer) focal length may require a longer mounting space in the longitudinal direction than that of other cameras, and as such, may adopt an optical lens system including a lens having a smaller diameter than the wide camera. However, as demand for higher zoom performance increases, space limitations for mounting the camera may arise. Accordingly, electronic devices may include a camera module that may adopt a folded (or curved) optical lens system with potentially improved mountability when compared to other camera modules. For example, a camera module adopting a folded optical lens system may be implemented by shortening the light incident path while maintaining the effective focal length by refracting light two or more times.

The above-described information may be provided as background for the purpose of helping understanding of the disclosure. No claim or determination is made as to whether any of the foregoing is applicable as background art in relation to the disclosure.

SUMMARY

According to an embodiment of the disclosure, there may be provided an electronic device comprising: a lens group including at least one lens; an image sensor aligned along an optical axis from the lens group; and a reflective and refractive member disposed between the lens group and the image sensor on the optical axis, wherein the reflective and refractive member includes an incident surface where light passing through the lens group is incident, a first reflective surface inclined with respect to the incident surface, and a second reflective surface formed to be inclined with respect to the incident surface and spaced apart from the first reflective surface, wherein a first cutting plane inclined with respect to the incident surface and the first reflective surface is formed at an edge of the first reflective surface, wherein a second cutting plane inclined with respect to the incident surface and the second reflective surface is formed at an edge of the second reflective surface, and wherein the first cutting plane faces in a first direction, and the second cutting plane faces in a second direction different from the first direction.

According to an aspect of the disclosure, an electronic device is provided. The electronic device includes at least one lens, an image sensor aligned along an optical axis from the at least one lens, and a reflective and refractive member disposed between the at least one lens and the image sensor on the optical axis. The reflective and refractive member includes an incident surface on which light passing through the at least one lens is incident, a first reflective surface inclined with respect to the incident surface, and a second reflective surface inclined with respect to the incident surface and spaced apart from the first reflective surface. A first cutting plane inclined with respect to the incident surface and is formed at an first edge of the first reflective surface. A second cutting plane inclined with respect to the incident surface and is formed at an second edge of the second reflective surface. The first cutting plane faces in a first direction, and the second cutting plane faces in a second direction different from the first direction.

According to an aspect of the present disclosure, an electronic device is provided. The electronic device includes at least one lens, an image sensor aligned along an optical axis from the at least one lens, and at least one reflective and refractive member disposed between the at least one lens and the image sensor on the optical axis. A lens assembly including the at least one lens, the image sensor, and the at least one reflective and refractive member forms a folded optical lens system in which a path of light incident on the at least one lens is reflected or refracted at least twice. A first reflective and refractive member from among the at least one reflective and refractive member, closest to an image side of the image sensor includes an incident surface where light passing through the at least one lens is incident. A first reflective surface is inclined with respect to the incident surface. A second reflective surface is formed to be inclined with respect to the incident surface and spaced apart from the first reflective surface. A first cutting plane inclined with respect to the incident surface and is formed at an first edge of the first reflective surface. A second cutting plane inclined with respect to the incident surface and is formed at an second edge of the second reflective surface. The first cutting plane faces in a first direction, and the second cutting plane faces in a second direction different from the first direction.

Additional aspects may be set forth in part in the description which follows and, in part, may be apparent from the description, and/or may be learned by practice of the presented embodiments.

BRIEF DESCRIPTION OF THE DRAWINGS

The foregoing and other aspects, configurations, and/or advantages of an embodiment of the disclosure will be more apparent from the following description taken in conjunction with the accompanying drawings, in which.

DETAILED DESCRIPTION

Figure 1:
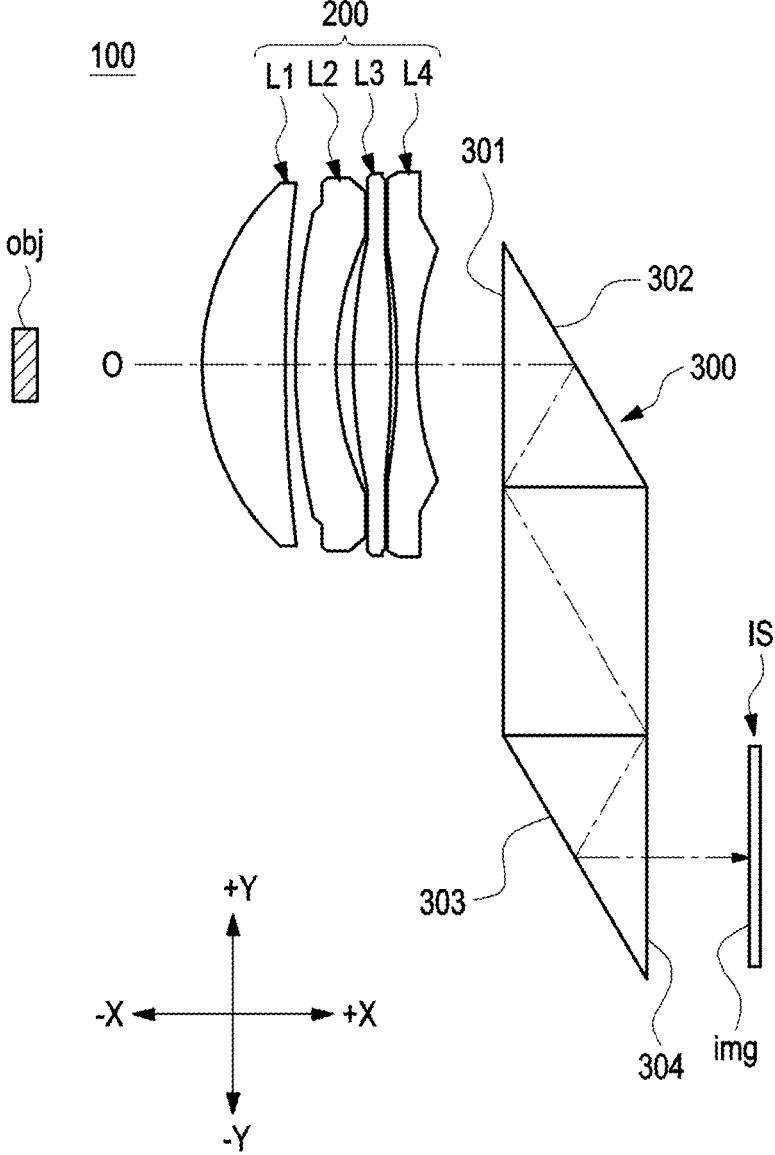
FIG. 1 is a view illustrating a camera module including a reflective and refractive member, according to an embodiment.

In the case of a camera module including a reflective and refractive member, a folded optical lens system that changes the traveling direction of light at an angle of 45 degrees may be used to reflect or refract the optical axis once using a prism or a mirror, thereby helping to simplify the electronic device. However, it may be hard to reduce the overall length of the optical lens system and to reduce the height of the module.

Further, a camera module employing a folded optical lens system includes a prism or a reflective and refractive member using a mirror as a member for changing the light path, and as the optical axis is reflected or refracted two or more times by using the prism, unnecessary images may be obtained as the light enters the imaging plane of the image sensor in an unexpected path.

A camera module including a folded optical lens system may generate stray light (or flare) in which the light reflected along an unwanted light path in a prism or mirror is imaged on the image sensor as it is.

Objects of the disclosure are not limited to the foregoing, and other unmentioned objects would be apparent to one of ordinary skill in the art from the following description.

The following description taken in conjunction with the accompanying drawings may provide an understanding of various exemplary implementations of the disclosure, including claims and their equivalents. The specific embodiments disclosed in the following description entail various specific details to aid understanding, but are regarded as one of various embodiments. Accordingly, it will be understood by those skilled in the art that various changes and modifications may be made to the various implementations described in the disclosure without departing from the scope and spirit of the disclosure. Further, descriptions of well-known functions and configurations may be omitted for clarity and brevity.

The terms and words used in the following description and claims are not limited to the bibliographical meaning, but may be used to clearly and consistently describe an embodiment of the disclosure. Therefore, it will be apparent to those skilled in the art that the following description of various implementations of the disclosure is provided only for the purpose of description, not for the purpose of limiting the disclosure defined as the scope of the claims and equivalent thereto.

The singular forms "a," "an," and "the" are intended to include the plural forms as well, unless the context clearly indicates otherwise. Thus, as an example, "a component surface" may be interpreted as including one or more of the surfaces of a component.

In the following embodiments, there may be provided various embodiments of a camera module capable of reducing or preventing stray light. The camera module may be mounted and used in various electronic devices. Hereinafter, embodiments of the present disclosure are described with reference to the accompanying drawings.

For example, an electronic device, according to an embodiment, may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Motion Pictures Expert Group (MPEG) Audio Layer III (MP3) player, a mobile medical device, a camera, a wearable device, and the like. The wearable device may include, but not be limited to, at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, the electronic device may include, but not be limited to, at least one of a television (TV), a digital video disk (DVD) player, an audio player, a refrigerator, an air conditioner, a cleaner, an oven, a microwave oven, a washer, a drier, an air cleaner, a set-top box, a home automation control panel, a security control panel, a media box (e.g., Samsung Home-Sync™, Apple TV™, or Google TV™), a gaming console (e.g., Xbox™ or PlayStation™), an electronic dictionary, an electronic key, a camcorder, an electronic picture frame, and the like.

According to an embodiment, the electronic device may include, but not be limited to, at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs) of financial organizations, point of sales (POS) devices of stores, or Internet of things devices (e.g., a bulb, various sensors, a sprinkler, a fire alarm, a thermostat, a street light, a toaster, fitness equipment, a hot water tank, a heater, or a boiler). According to some embodiments, examples of the electronic device may at least one of part of furniture or building/structure, an electronic board, an electronic signature receiving device, a projector, or various measurement devices (e.g., devices for measuring water, electricity, gas, or electromagnetic waves). In various embodiments, the electronic device may be flexible, or a combination of two or more of the various devices described above. According to an embodiment of the disclosure, the electronic devices are not limited to those described above. As used herein, the term "user" may denote a human or another device (e.g., an artificial intelligent electronic device) using the electronic device. The electronic devices according to an embodiment are not limited to those described above.

According to an embodiment, the electronic device may include one or more optical devices (e.g., camera module 100). In an embodiment, the optical devices may be equipped with a lens assembly.

Although some numbers may be presented in describing an embodiment of the present disclosure, it should be noted that the numbers may not limit the embodiment as long as the numbers are not set forth in the claims.

Figure 2A:
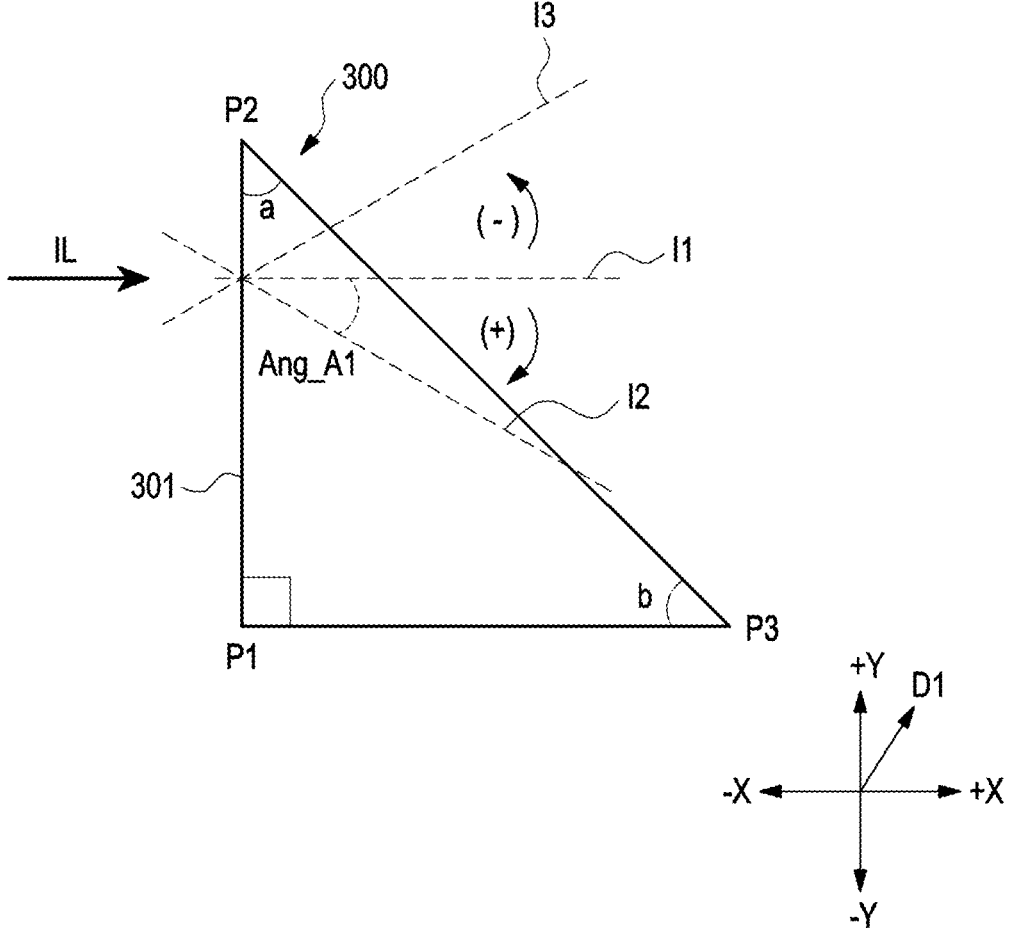
FIG. 2A is an enlarged view illustrating a vertex portion between an incident surface and a first reflective surface of a reflective and refractive member, according to an embodiment.
Figure 2B:
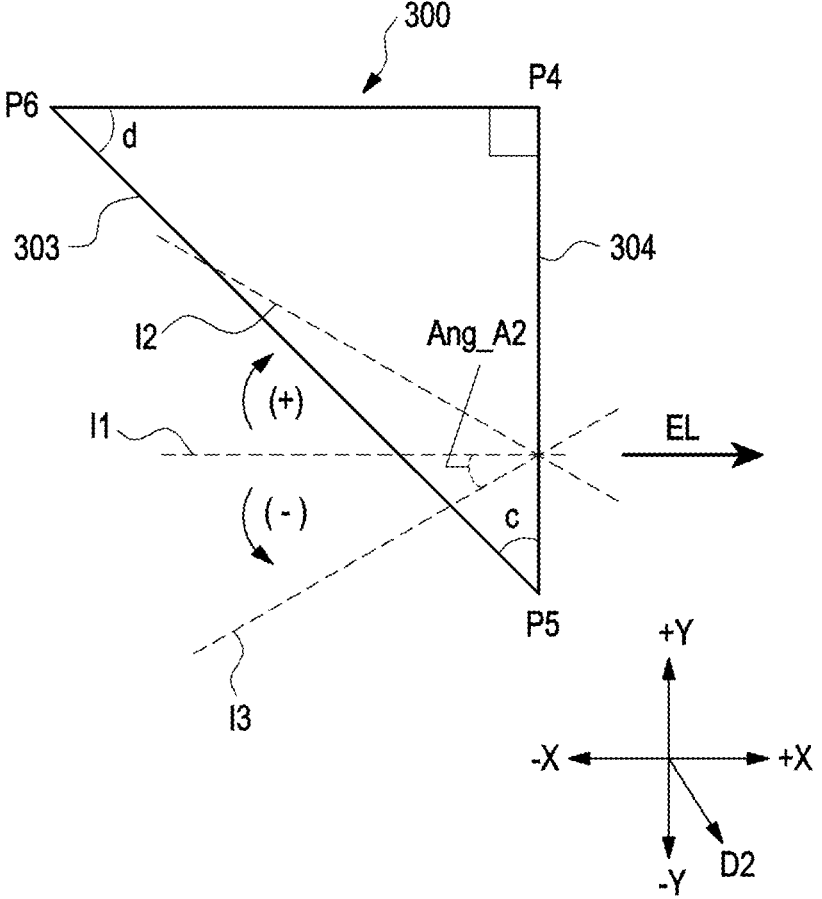
FIG. 2B is an enlarged view illustrating a vertex portion between an exit surface and a second reflective surface of a reflective and refractive member, according to an embodiment.

FIG. 1 is a view of a camera module 100 including a reflective and refractive member 300, according to an embodiment. FIG. 2A is an enlarged view of a vertex portion between an incident surface and a first reflective surface of a reflective and refractive member 300, according to an embodiment. FIG. 2B is an enlarged view illustrating a vertex portion between an exit surface and a second reflective surface of a reflective and refractive member 300, according to an embodiment. FIGS. 2A and 2B may be enlarged views of an entire edge of the reflective and refractive member 300 and/or enlarged views of a portion of the edge.

In the following description, the length direction, the width direction, and/or the thickness direction of the components included in the camera module 100 and/or the camera module 100 may be described. As used herein, the length direction may refer to a Y-axis direction, the thickness direction may refer to an X-axis direction, and the width direction may refer to an X-axis direction and a direction perpendicular to the Y-axis direction. In an embodiment, a direction perpendicular to the X-axis direction and the Y-axis direction may refer to a 'Z-axis direction' of the Cartesian coordinate system. In an embodiment, the direction in which the surface of a component faces may refer to the direction in which a normal drawn from the surface of the component faces. In an embodiment, negative and/or positive signs (e.g., "−", "+") may be mentioned together with the Cartesian coordinate system exemplified in the drawings with respect to the direction in which the component is oriented. For example, the surface facing the object side of the lens (e.g., the first lens L1) closest to the object side O of the camera module 100 and/or the incident surface 301 of the reflective and refractive member 300 may be referred to as a surface facing in the −X-axis direction, and the surface facing the image side I of the lens (e.g., the fourth lens L4) closest to the image sensor IS side of the camera module 100 and/or the exit surface 304 of the reflective and refractive member 300 may be referred to as a surface facing in the +X-axis direction. However, the description of the directions is not limited thereto and the directions may be described in a different manner without deviating from the scope of the present disclosure.

In an embodiment, when an electronic device including the camera module 100 is mounted is a portable terminal such as a smartphone, the front surface of the electronic device may be referred to as a surface facing in the −X-axis direction and the rear surface of the electronic device may be referred to as a surface facing in the +X-axis direction. When the camera module 100 is a front camera mounted on the electronic device, a surface of the lens (e.g., the first lens L1) closest to the object (obj) side O of the camera module 100 that faces the object side may face in the same direction as the front surface of the electronic device. When the camera module 100 is a rear camera mounted on the electronic device, a surface of the lens (e.g., the first lens L1) closest to the object (obj) side O of the camera module 100 that faces the object side may face in the same direction as the rear surface of the electronic device. As such, in the description of the directions, the directions are merely divided for convenience and may not limit the arrangement directions of the camera module 100 and the components, and may be set in various ways according to an embodiment. In an embodiment, the X-axis direction may include both the –X direction and the +X direction. the Y-axis direction may include both the –Y-axis direction and the +Y-axis direction. the Z-axis direction may include both the +Z-axis direction' and the –Z-axis direction'. For example, the thickness of the electronic device may be defined as the distance between the front surface (the surface facing in the –X-axis direction) of the electronic device and the rear surface (the surface facing in the +X-axis direction) of the electronic device, and the thickness direction of the electronic device may be defined as the X-axis direction. It should be noted that the directions are so defined with respect to the Cartesian coordinate system shown in the drawings for the sake of brevity of description, and the description of these directions or components do not limit an embodiments of the disclosure.

According to an embodiment, the electronic device may include at least one of a wide camera, an ultra-wide camera, a close-up camera, a tele camera, or an infrared photodiode as a lens assembly or a light-receiving element, and may include a flash and/or an infrared laser diode as a light source and/or a light-emitting element. In an embodiment, the electronic device may emit infrared laser to the object obj and receive the infrared laser reflected by the object obj, using the infrared laser diode and/or the infrared photo diode, thereby detecting the distance and/or depth to the object obj. In an embodiment, the electronic device may photograph the object obj by using the camera module 100 that may combine any one or two or more of the above-mentioned cameras, and may provide light toward the object obj by using the flash if necessary.

According to an embodiment, among the cameras that may be included in the camera module 100, the wide camera, the ultra-wide camera, or the close-up camera may have a smaller lens total length along the optical axis direction of the lenses as compared with the tele camera. For example, the lens total length of the tele cameras having a relatively long focal length may be greater than that of other cameras. The lens total length may refer to a distance from the object side surface of the first lens L1 on the object side to the imaging plane img of the image sensor IS. In an embodiment, even if the wide camera, the ultra-wide camera, or the close-up camera arrange the lenses along the thickness direction (e.g., +X axis and/or –X axis direction) of the electronic device, the effect on the thickness of the electronic device may be substantially smaller than that of the tele camera. For example, a wide camera, an ultra-wide camera, or a close-up camera may be disposed in the electronic device in a state in which the direction in which light is incident from the outside to the electronic device and the direction of the optical axis of the lenses are substantially the same.

The wide cameras, ultra-wide cameras, or close-up cameras may be referred to as vertical type optical lens systems. In an embodiment, when compared with a wide camera, an ultra-wide camera, or a close-up camera, a tele camera may have a small field of view, but may be useful for photographing the object at a longer distance. The tele camera may include more lenses as compared to a wide camera, an ultra-wide camera, or a close-up camera. For example, when the lens group 200 including at least one lens is arranged in the thickness direction (e.g., +X axis and/or –X axis direction) of the electronic device, the thickness of the electronic device may increase, or the lens group 200 may substantially protrude to the outside of the electronic device. The tele camera may include at least one reflective and refractive member (or refractive member) 300 that reflects or refracts light incident on the lens group 200 in another direction to reduce the thickness of the electronic device including the lens group 200. In implementing the telephoto function, the lens group 200 including at least one lenses may be arranged to move forward and backward in the incident direction of light or the traveling direction of the reflected or refracted light, thereby preventing or reducing the thickness of the electronic device from increasing.

According to an embodiment, the electronic device may include a lens assembly having an optical axis (O-I) (denoted in the dash-dotted line) from an object side (O) to an image side (IS). Here, the object side may indicate a direction in which the object obj is positioned, and the image side may indicate a direction in which the imaging plane img is formed. Further, the surface facing the object side O of the lens may refer to a surface facing the object obj with respect to the optical axis O-I and may refer to a left surface (or front surface) of the lens in the drawings. according to an embodiment of the disclosure, and the surface facing the image side I may refer to a surface facing the imaging plane img with respect to the optical axis O-I and may refer to a right surface (or rear surface) of the lens in the drawings. The imaging plane img may be a portion of an image capturing element and/or image sensor IS where an image forms. The optical axis O-I may refer to a light path passing through the center of the at least one lens and the center of the image sensor IS when the lens group 200 including the at least one lens and the image sensor IS are aligned.

Meanwhile, in the case of the camera module 100 including the lens assembly forming the vertical type optical lens system, the optical axis O-I may be formed parallel to any one direction (e.g., the X-axis direction) of the Cartesian coordinate system. Alternatively, in the camera module 100 including the lens assembly forming the curved optical lens system, the optical axis O-I may include a light path parallel to any one direction (e.g., the X-axis direction) of the Cartesian coordinate system, but the path may be bent to include a light path toward another portion of the component (e.g., the reflective and refractive member 300) included in the camera module 100.

Hereinafter, according to an embodiment, in describing the plurality of lenses (e.g., first lens L1, second lens L2, third lens L3, and fourth lens L4), the portion of each lens, which is close to the optical axis O-I may be referred to as a chief portion, and the portion further from the optical axis O-I (or around the edge of the lens) may be referred to as a marginal portion. The chief portion may be a portion crossing the optical axis O-I in the first lens L1. The marginal portion may be a portion spaced apart from the optical axis by a predetermined distance in the first lens L1. The marginal portion may include an end portion of the lens which may be positioned farthest from the optical axis O-I of the lens. As used herein, the direction in which the lens included in the camera module 100 faces may refer to the direction in which the chief portion and/or the marginal portion of the corresponding lens surface faces.

The camera module 100 illustrated in FIG. 1 is a tele camera including a lens group 200 including at least one lens and an image sensor IS, and may include a folded optical lens system (e.g., a curved optical lens system) configured such that the traveling direction of light is bent at least twice. As used herein, the camera module 100 including such a folded optical lens system may be referred to as a folded camera. The folded camera 100 may include a reflective and refractive member 300 capable of reflecting and/or refracting the traveling direction of light at least twice between the lens group 200 including at least one lens and the image sensor IS so as to bend the traveling direction of light at least twice.

According to an embodiment, the lens group 200 may include one lens or may include a combination of a plurality of lenses. For example, the lens group 200 may include a first lens L1, a second lens L2, a third lens L3, and a fourth lens L4. A plurality of lenses (e.g., L1, L2, L3, and L4) may be disposed in an optical axis alignment state with the image sensor IS. Although FIG. 1 illustrates four lenses (e.g., L1, L2, L3, and L4), the present disclosure is not limited thereto. For example, a smaller number of lenses and/or a larger number of lenses may be disposed than those illustrated in the drawings.

The image sensor IS may be configured to detect light reflected and/or refracted by the reflective and refractive member 300 and incident on the imaging plane img. For example, light incident from the outside of the camera module 100 may be detected by the image sensor IS via the lens group 200 and the reflective and refractive member 300, and the electronic device may obtain an object image based on a signal and/or information detected through the image sensor IS. According to an embodiment, in performing the image stabilization operation, the image sensor IS may be shifted in the length direction (e.g., +Y or −Y-axis direction) or the width direction (e.g., a direction perpendicular to +Y, −Y-axis, +X-axis, and −X-axis) of the camera module 100. In an embodiment, when the lens assembly is used as a tele camera, the image quality of the captured image may be further enhanced by being equipped with an image stabilization function. In an embodiment, when the image sensor IS becomes larger, the optical performance of the camera module 100 may be further increased.

According to an embodiment, the reflective and refractive member 300 may be disposed between the lens group 200 and the image sensor IS. The light incident on the lens group 200 from the outside may be reflected at least twice through the reflective and refractive member 300 and may be focused and/or aligned with the image sensor IS. Accordingly, the optical lens system from the lens group 200 to the image sensor IS may be downsized. A camera having such a structure may be referred to as a lens lead type camera.

The reflective and refractive member 300 may include a prism, a mirror that transmits light, a mirror that reflects light, and/or an opening. For example, the reflective and refractive member 300 may be provided with a prism on one side and a mirror reflecting light on the other side. Further, the reflective and refractive member 300 may be configured such that at least two surfaces thereof are formed of prisms to reflect and/or refract light. According to an embodiment, the reflective and refractive member 300 may be formed by a combination of a plurality of prisms and/or mirrors. According to an embodiment, the reflective and refractive member 300 may be formed by combining a plurality of prism pieces and/or mirror pieces. For example, the reflective and refractive member 300 may be formed by combining prism pieces having a triangular and/or rectangular cross section and/or mirror pieces to form one reflective and refractive member 300 as shown in FIG. 1.

In an embodiment, the reflective and refractive member 300 may include an incident surface 301 where light passing through the lens group 200 is incident, a first reflective surface 302 inclined with the incident surface 301, and a second reflective surface 303 inclined with the incident surface 301 and spaced apart from the first reflective surface 302.

Referring to FIGS. 1 to 2B together, the incident surface 301 may be a surface through which light IL passing through the lens group 200 may enter the reflective and refractive member 300. According to an embodiment, the incident surface 301 may be formed to be spaced apart from a lens (e.g., the fourth lens L4) closest to the image side I of the lens group 200 by a predetermined distance in the direction of the image side I. According to an embodiment, the incident surface 301 may be parallel to the front surface (e.g., a surface parallel to the −X-axis direction) and the rear surface (e.g., a surface parallel to the +X-axis direction) of the electronic device, respectively, and the optical axis O-I may be orthogonal to the incident surface 301. According to an embodiment, an opening may be formed in at least a portion of the incident surface 301, or a prism or mirror capable of transmitting light may be formed to transmit light. The first reflective surface 302 may be a surface where light incident on the incident surface 301 is initially reflected and/or refracted.

Referring to FIG. 2A, the first reflective surface 302 may be formed to be inclined with respect to the incident surface 301. For example, when the cross section of the edge portion of the reflective and refractive member 300 is enlarged, the reflective and refractive member 300 may be conceptually represented as a triangle having three vertices P1, P2, and P3. Here, the vertex P2 may be a vertex between the first reflective surface 302 and the incident surface 301. For example, the inclination angle α between the first reflective surface 302 and the incident surface 301 formed at the vertex P2 may be set to vary according to an embodiment. However, in general, when the inclination angle α has a very small acute angle (e.g., when pointed), it may be difficult to handle the lens (e.g., to insert the lens into the lens barrel) in the process of assembling the lens assemblies of the camera module 100. For example, among the three vertices P1, P2, and P3, the vertex P1 may have a value of about 90 degrees, and the inclination angle b at the vertex P3 may be set to a value that may be automatically determined when the inclination angle α at the vertex P2 is designated. The reflective and refractive member 300, according to an embodiment of the disclosure, may be formed with a cutting plane for reducing and/or preventing stray light, and as shown in FIG. 2A, the cutting plane positioned on the side of the incident surface 301 may face in the first direction D1.

According to an embodiment, the reflective and refractive member 300 may include an exit surface 304 through which light EL passing through the reflective and refractive member 300 may exit. According to another embodiment, the reflective and refractive member 300 may include a second reflective surface 303 formed to be inclined with the incident surface 301 (or the exit surface 304) and spaced apart from the first reflective surface 302.

Referring to FIG. 2B, when a cross section of another edge portion of the reflective and refractive member 300 is enlarged, the reflective and refractive member 300 may be conceptually represented as a triangle having three vertices P4, P5, and P6. Here, the vertex P5 may be a vertex between the second reflective surface 303 and the exit surface 304. For example, the inclination angle c between the second reflective surface 303 and the exit surface 304 formed at the vertex P5 may be set to vary according to an embodiment. Among the three vertices P4, P5, and P6, the vertex P4 may be set to about 90 degrees, and the inclination angle d at the vertex P6 may be set to a value that may be automatically determined when the inclination angle c at the vertex P5 is designated. The reflective and refractive member 300, according to an embodiment of the disclosure may be formed with a cutting plane for reducing and/or preventing stray light, and as shown in FIG. 2B, the cutting plane positioned on the exit surface 304 may face in the second direction D2.

According to an embodiment, light incident perpendicular to the incident surface 301 of the reflective and refractive member 300 may pass through an internal space (e.g., an optical waveguide) surrounded by the incident surface 301, the first reflective surface 302, the second reflective surface 303, and the exit surface 304 of the reflective and refractive member 300 and may exit perpendicular to the exit surface 304. According to an embodiment, the incident surface 301 of the reflective and refractive member 300 may be referred to as a first surface, the first reflective surface 302 may be referred to as a second surface, the second reflective surface 303 may be referred to as a third surface, and the exit surface 304 may be referred to as a fourth surface.

The exit surface 304 through which light is emitted may be formed to be spaced apart from the incident surface 301 as a surface different from the incident surface 301 through which light is incident. According to an embodiment, the exit surface 304 may face and/or may be substantially parallel to the incident surface 301 while being spaced apart from the incident surfaces 301 by a predetermined distance. According to an embodiment, the incident surface 301 and the exit surface 304 may face in opposite directions, and the first reflective surface 302 and the second reflective surface 303 may face in opposite directions. According to an embodiment, the reflective and refractive member 300 may have a parallelogram cross-sectional shape in which the incident surface 301 and the exit surface 304 are substantially parallel, and the first reflective surface 302 and the second reflective surface 303 are substantially parallel. In this case, the incident surface 301 may be expressed as being inclined in the same direction as the exit surface 304, and the first reflective surface 302 may be expressed as being inclined in the same direction as the second reflective surface 303. In the embodiments of FIGS. 1 to 2B, the light passing through the reflective and refractive member 300 may face in the direction in which the light is incident and the direction in which the light is emitted may be the same with respect to the light traveling along the optical axis O-I.

According to an embodiment of the disclosure, in the reflective and refractive member 300, a first cutting plane (e.g., the first cutting plane 305 of FIG. 9) inclined with respect to the incident surface 301 and the first reflective surface 302 may be formed at an edge of the first reflective surface 302, and a second cutting plane (e.g., the second cutting plane 306 of FIG. 9) inclined with respect to the exit surface 304 and the second reflective surface 303 may be formed at an edge of the second reflective surface 303.

Referring to FIGS. 2A and 2B together, the first cutting plane 305 may be formed to face in the first direction (e.g., first direction D1 of FIG. 2A), and the second cutting plane 306 may be formed to face in a direction different from the first direction at the position spaced apart from the first cutting plane 305. For example, the second cutting plane 306 may be formed to face in a second direction (e.g., second direction D2 of FIG. 2B) that may be different from the first direction D1. According to an embodiment, the first cutting plane 305 may be a cross section cut along the second virtual line 12 drawn to have a predetermined angle in the clockwise direction (+) from a point on the first virtual line 11 parallel to the optical axis O-I or the optical axis O-I. The first cutting plane 305 may be the cross section cut in the traveling direction and an inclined direction of light parallel to the optical axis O-I. The second cutting plane 306 may be a cross section cut along the second virtual line 13 drawn to have a predetermined angle in the counterclockwise direction (—) from a point on the first virtual line 11 parallel to the optical axis O-I or the optical axis O-I. The second cutting plane 306 may be the cross section cut in the traveling direction and an inclined direction of light parallel to the optical axis O-I. In an embodiment (first embodiment), the first cutting plane 305 and the second cutting plane 306 may be formed to be inclined to opposite sides with respect to the optical axis O-I. For example, the first cutting plane 305 may be formed to form a predetermined angle from the optical axis O-I in the clockwise direction (+), and the second cutting plane 306 may be formed to form a predetermined angle from the optical axis O-I in the counterclockwise direction (—). When the first cutting plane 305 and the second cutting plane 306 face in the same direction (e.g., clockwise (+) or counterclockwise (–)) with respect to the optical axis O-I, the light path through which the stray light travels in the inner space of the reflective and refractive member 300 may not be reduced or removed but may be present, and in some embodiments, another light path may be formed. The reflective and refractive member 300 may include the first cutting plane 305 and the second cutting plane 306 inclined to opposite sides with respect to the optical axis O-I, thereby potentially reducing and/or preventing the generation of stray light and/or potentially reducing and/or preventing the generation of flare.

According to an embodiment, the camera module 100, including the reflective and refractive member 300, may satisfy Formula 1 and/or Formula 2 below to reduce and/or prevent the generation of stray light (and/or to reduce and/or prevent the generation of flare).

$$5 < |Ang\_A1| < 50 \qquad \text{[Formula 1]}$$

$$5 < |Ang\_A2| < 50 \qquad \text{[Formula 2]}$$

Here, Ang_A1 of formula 1 may be the angle (e.g., Ang_A1 of FIG. 2A) between the optical axis O-I and the first cutting plane 305, and Ang_A2 of formula 2 may be the angle (e.g., Ang_A2 of FIG. 2B) between the optical axis O-I and the second cutting plane 306. When the angle between the first cutting plane 305 and the second cutting plane 306 is smaller than the lower limit in Formulas 1 and 2 (e.g., 5 degrees), the possibility of occurrence of stray light (and/or flare) may increase, and the intensity thereof may also increase. Alternatively, when the angle between the first cutting plane 305 and the second cutting plane 306 is greater than the upper limit in Formulas 1 and 2 (e.g., 50 degrees), processing of the reflective and refractive member 300 may be difficult, and a new sharp angle may be formed by the processed surface (e.g., the first cutting plane 305 and the second cutting plane 306), making it difficult to handle the reflective and refractive member 300.

According to an embodiment, the camera module 100, including the reflective and refractive member 300, may satisfy Formula 3 below to reduce and/or prevent the generation of stray light (and/or to reduce and/or prevent the generation of flare).

$$-10 < Ang\_A1/Ang\_A2 < -0.1 \qquad \text{[Formula 3]}$$

Formula 3 may mean that the angle (e.g., Ang_A1 in FIG. 2A) between the optical axis O-I and the first cutting plane 305 and the angle (e.g., Ang_A2 in FIG. 2B) between the optical axis O-I and the second cutting plane 306 face in opposite directions. As described above, the disclosure may include the first cutting plane 305 and the second cutting plane 306 facing in opposite directions with respect to the optical axis O-I, thereby reducing or preventing the generation of stray light (or reducing or preventing the generation of flare).

According to an embodiment, at least one of the first reflective surface 302 and the second reflective surface 303 may be formed to satisfy a total reflection condition. Further, according to embodiments, the reflective and refractive member 300 may include a first reflective surface 302 and/or a second reflective surface 303 coated with a high reflectance material. According to another embodiment, the reflective and refractive member 300 may satisfy Formula 4 below.

$$25 < Vd\_1 < 95 \qquad \text{[Formula 4]}$$

Here, Vd_1 of formula 4 represents the variance value (and/or Abbe number) of the reflective and refractive member 300, which may be related to the refractive index of the reflective and refractive member 300. The reflective and refractive member 300 may be positioned between the lens group 200 and the imaging plane img of the image sensor IS, thereby affecting aberration such as curvature and/or chromatic aberration. When the dispersion value of the reflective and refractive member 300 is greater than the upper limit (e.g., 95) value, it may be advantageous to correct the chromatic aberration. However, due to the soft material, it may be difficult to assemble the lens assembly and manage the process. On the other hand, when it becomes smaller than the lower limit (e.g., 25) of the reflective and refractive member 300, the overall properties of the material may be improved, but it may be difficult to control the chromatic aberration.

Further, e.g., the reflective and refractive member 300 may allow at least one of the first cutting plane 305 and the second cutting plane 306 to have an illuminance (roughness) capable of relatively reducing the reflectance of light passing through the at least one cutting plane 306. For example, at least one of the first cutting plane 305 and the second cutting plane 306 may be corroded and/or black lacquered to obtain illuminance capable of relatively reducing the reflectance of light. Alternatively, by printing and/or depositing a coating layer on the at least one of the first cutting plane 305 and the second cutting plane 306, an illuminance (roughness) capable of relatively reducing reflectance may be obtained.

According to an embodiment, a coating capable of blocking light of about 700 nanometers (nm) or more by about 80% or more may be applied to the cutting plane of at least one of the incident surface 301 or the exit surface 304 of the reflective and refractive member 300. By allowing the incident surface 301 and/or the exit surface 304 to block light of about 700 nm or more by 80% or more, it may be possible to block light (e.g., infrared rays) of visible light or more.

According to an embodiment of the disclosure, the lens assembly including the lens group 200, the image sensor IS, and the reflective and refractive member 300 may satisfy Formula 5 below.

$$5 < FOV < 35 \qquad \text{[Formula 5]}$$

Here, the FOV of formula 5 may be the field of view of the electronic device including the lens assembly. The electronic device including the reflective and refractive member 300 of the disclosure may target a folded optical lens system. When the field of view of the electronic device including the lens assembly is about 35 degrees or more, the focal length may be reduced, and the distance between the image sensor IS and the lens group 200 may decrease. Thus, it may be difficult to dispose the reflective and refractive member 300. On the other hand, when the field of view is about 5 degrees or less, the focal length may be too long, and the size of the entire optical lens system may increase.

Hereinafter, the first cutting plane 305 and the second cutting plane 306 are described in more detail with reference to FIGS. 3 to 10.

Figure 3:
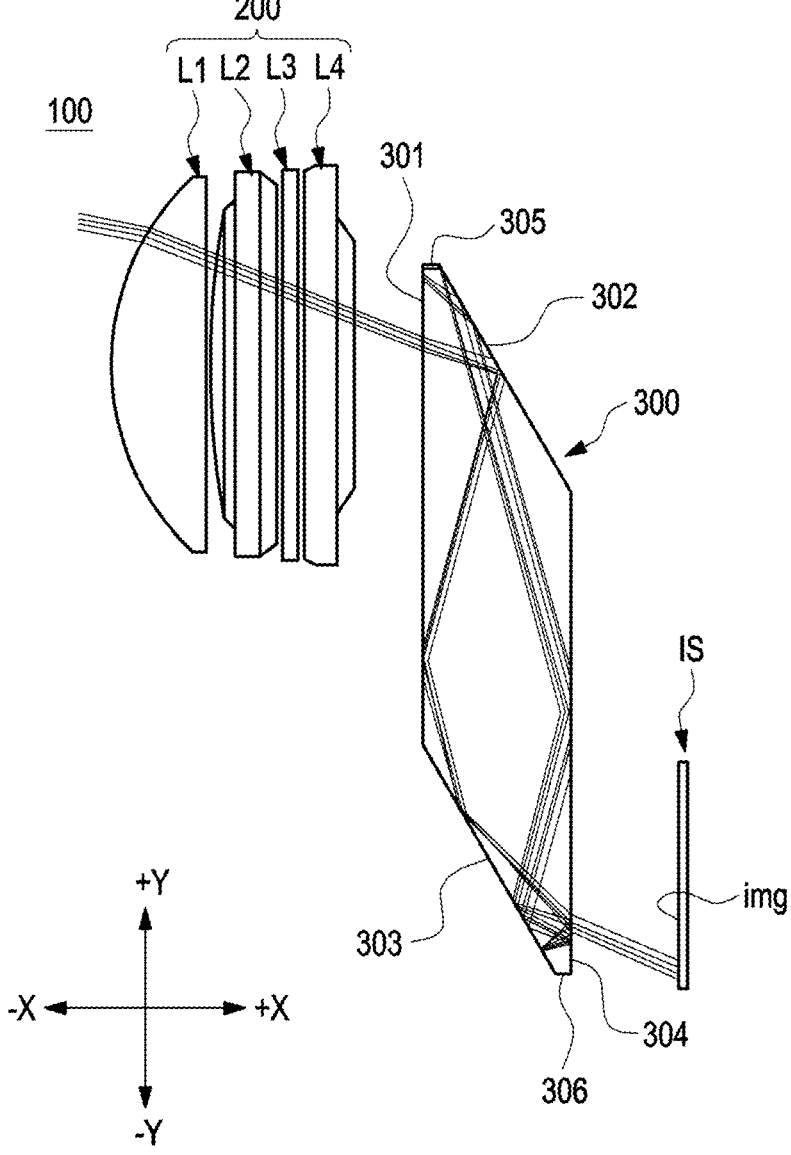
FIG. 3 is a view illustrating a camera module including a reflective and refractive member having a cutting plane parallel to an optical axis, according to an embodiment.
Figure 4:
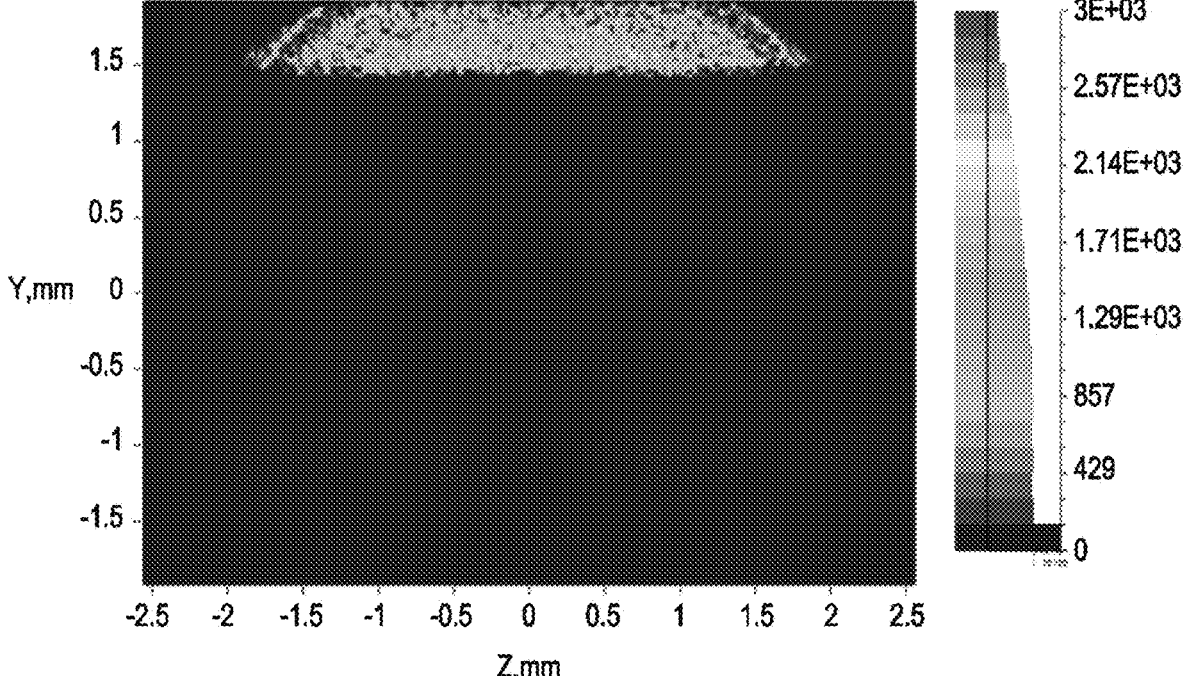
FIG. 4 is a view illustrating simulation results of performing light path tracking when light is incident on a camera module according to the embodiment of FIG. 3.

FIG. 3 is a view illustrating a camera module 100 including a reflective and refractive member 300 having a cutting plane 305 formed parallel to an optical axis O-I, according to an embodiment of the disclosure. FIG. 4 is a view illustrating simulation results of performing light path tracking when light is incident on a camera module 100 according to the embodiment of FIG. 3, according to an embodiment.

FIG. 4 illustrates, e.g., an image sensor IS having a width (e.g., a length in the Z-axis direction) of about 5 mm and a length (e.g., a length in the Y-axis direction) of about 4 mm. In the following embodiments, the image height IH of the image sensor IS may be mentioned, and since the image height IH corresponds to half of the diagonal length of the image sensor IS, it is described below based on the image height (IH) being about 3 mm. Hereinafter, the embodiments of FIGS. 6, 8, and 10 may all show simulation results for the image sensor IS having the same type and size as those of FIG. 4.

Referring to FIG. 3, a reflective and refractive member 300 having a cutting plane parallel to the optical axis O-I is disclosed. In an embodiment, the first cutting plane 305 may face in a direction parallel to the +Y axis, and the second cutting plane 306 may face in a direction parallel to the –Y axis. For example, FIG. 3 illustrates an embodiment in which the angle Ang_A1 between the optical axis O-I and the first cutting plane 305 is about 0 degrees, and the angle Ang_A2 between the optical axis O-I and the second cutting plane 306 is about 0 degrees.

FIGS. 3 and 4 may illustrate that, e.g., stray light generated when light having an inclination angle of about 10 degrees with respect to the optical axis O-I is incident on a marginal portion of the lens group 200 that is a predetermined distance away from the optical axis O-I may be detected by the image sensor IS, as shown by using the light path tracking simulation as shown in FIG. 4. For example, the simulation of FIG. 4 may show stray light formed on the image sensor IS. The image sensor IS may be disposed on a YZ plane or a plane parallel to the YZ plane, and in FIG. 4, the intensity of the light incident on the unit area of the image sensor IS may be expressed in mmlux (or 1 m/mm2)

Referring to FIG. 3, light incident on the lens group 200 may pass through the lens group 200 and then be incident on the incident surface 301 of the reflective and refractive member 300. The light incident through the incident surface 301 may be reflected at least twice inside the reflective and refractive member 300 and then emitted through the exit surface 304 to reach the image sensor IS.

Referring to FIGS. 3 and 4, when the angle Ang_A1 between the optical axis O-I and the first cutting plane 305 of the reflective and refractive member 300 is about 0 degrees and the angle Ang_A2 between the optical axis O-I and the second cutting plane 306 is about 0 degrees, a significant amount of stray light reaching the image sensor IS may be detected. Referring to FIG. 4, it may be identified that stray light of hundreds to thousands of mmlux (e.g., 500 mmlux to 2200 mmlux) is formed on the upper end of the image sensor IS.

Figure 5:
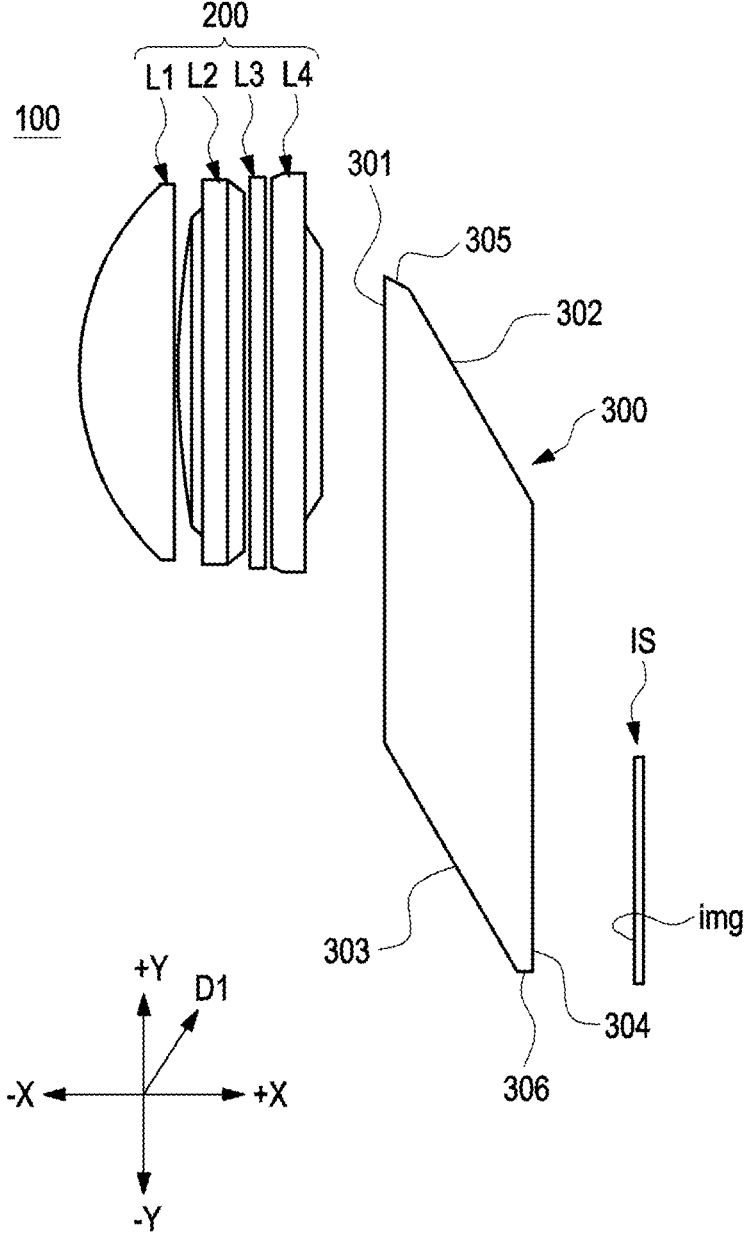
FIG. 5 is a view illustrating a camera module including a reflective and refractive member having a first cutting plane, according to an embodiment.
Figure 6:
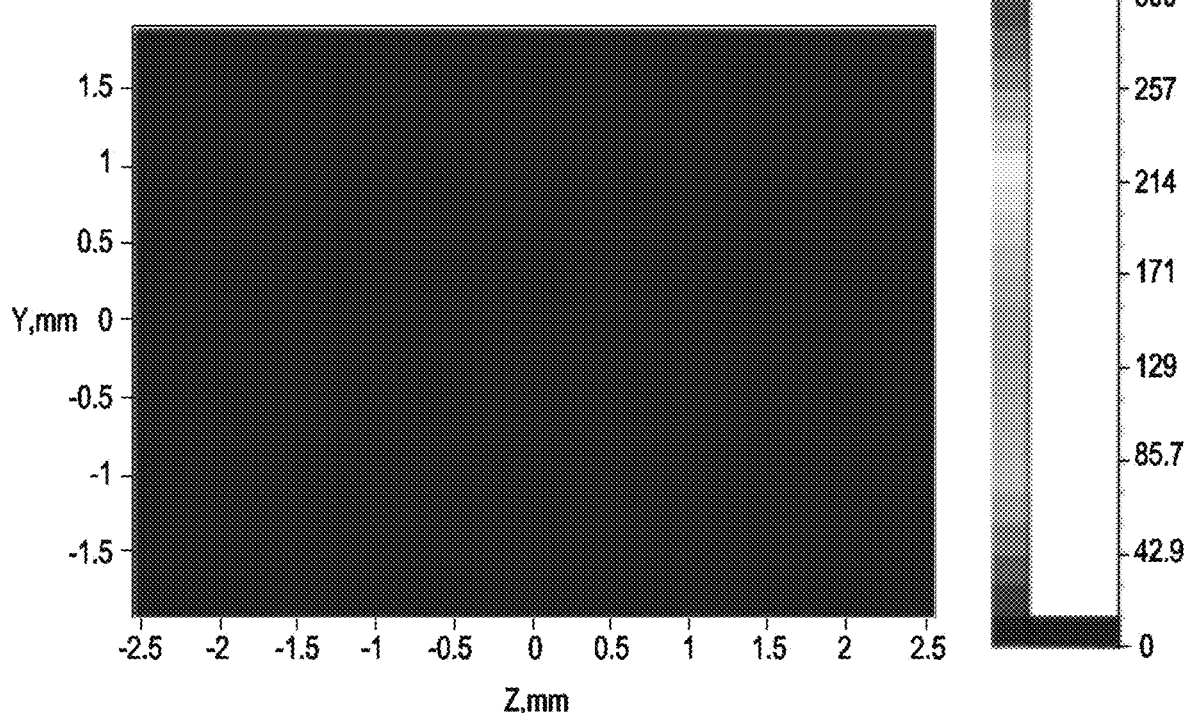
FIG. 6 is a view illustrating simulation results of performing light path tracking when light is incident on a camera module according to the embodiment of FIG. 5.

FIG. 5 is a view illustrating a camera module including a reflective and refractive member having a first cutting plane 305 according to an embodiment of the disclosure. FIG. 6 is a view illustrating simulation results of performing light path tracking when light is incident on a camera module according to the embodiment of FIG. 5.

Referring to FIG. 5, a reflective and refractive member 300 having a first cutting plane 305 inclined with respect to the incident surface 301 and the first reflective surface 302 (or inclined with respect to the optical axis O-I) is disclosed. In the embodiment of FIG. 5, the first cutting plane 305 may face in a direction between the +Y axis and the +X axis (the first direction D1), and the second cutting plane 306 may face in a direction parallel to the −Y axis. For example, FIG. 5 illustrates an embodiment in which the angle Ang_A1 between the optical axis O-I and the first cutting plane 305 is about 30 degrees, and the angle Ang_A2 between the optical axis O-I and the second cutting plane 306 is 0 degrees.

Like the embodiment of FIGS. 3 and 4, FIGS. 5 and 6 may show that the stray light generated when light having an inclination angle of about 10 degrees with respect to the optical axis O-I is incident on the marginal portion of the lens group 200 the predetermined distance away from the optical axis O-I is detected through the light path tracking simulation.

The light incident on the lens group 200 may pass through the lens group 200 and then be incident on the incident surface 301 of the reflective and refractive member 300. The light incident through the incident surface 301 may be reflected at least twice inside the reflective and refractive member 300 and then emitted through the exit surface 304 to reach the image sensor IS. Referring to FIG. 5, it may be identified that, unlike the embodiment of FIG. 3, no stray light reaching the image sensor IS is detected.

Referring to FIGS. 5 and 6, when the angle Ang_A1 between the optical axis O-I and the first cutting plane 305 of the reflective and refractive member 300 is about 30 degrees and the angle Ang_A2 between the optical axis O-I and the second cutting plane 306 is about 0 degrees, it may be identified that no stray light reaching the image sensor IS is detected.

Figure 7:
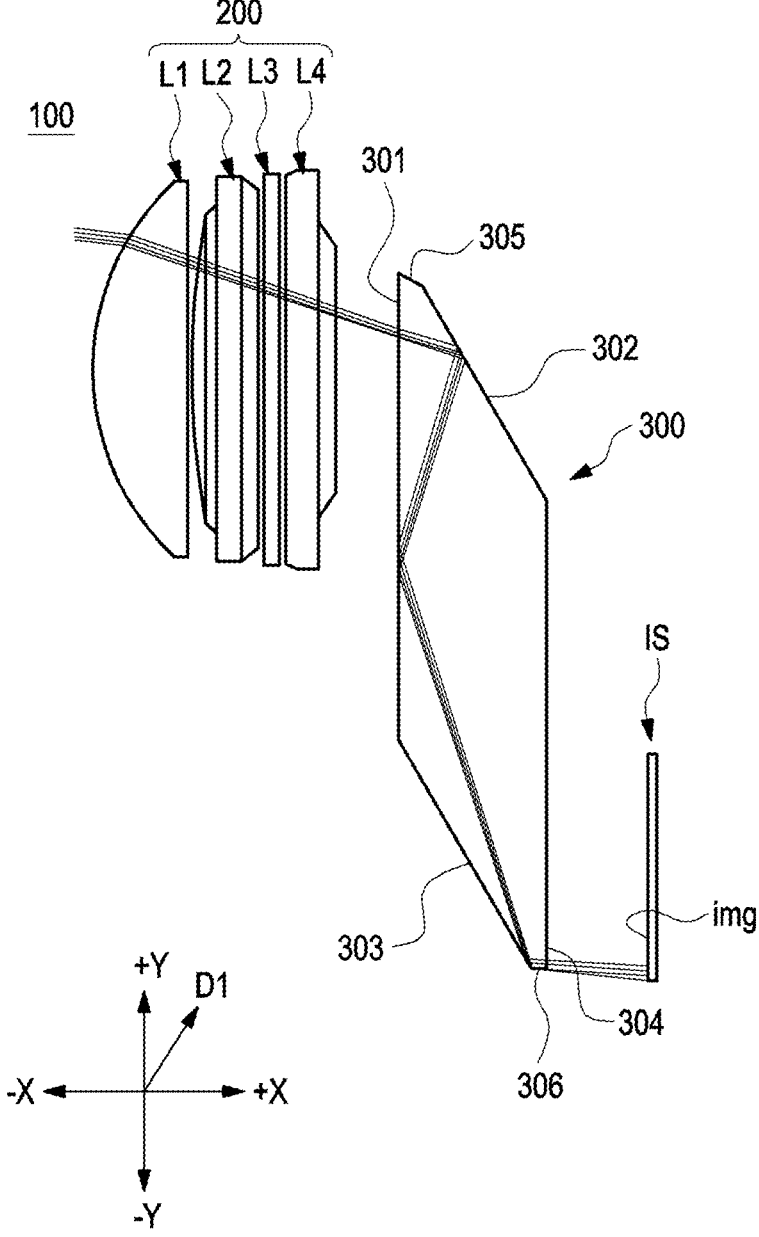
FIG. 7 is a view illustrating a camera module including a reflective and refractive member having a first cutting plane, according to an embodiment.
Figure 8:
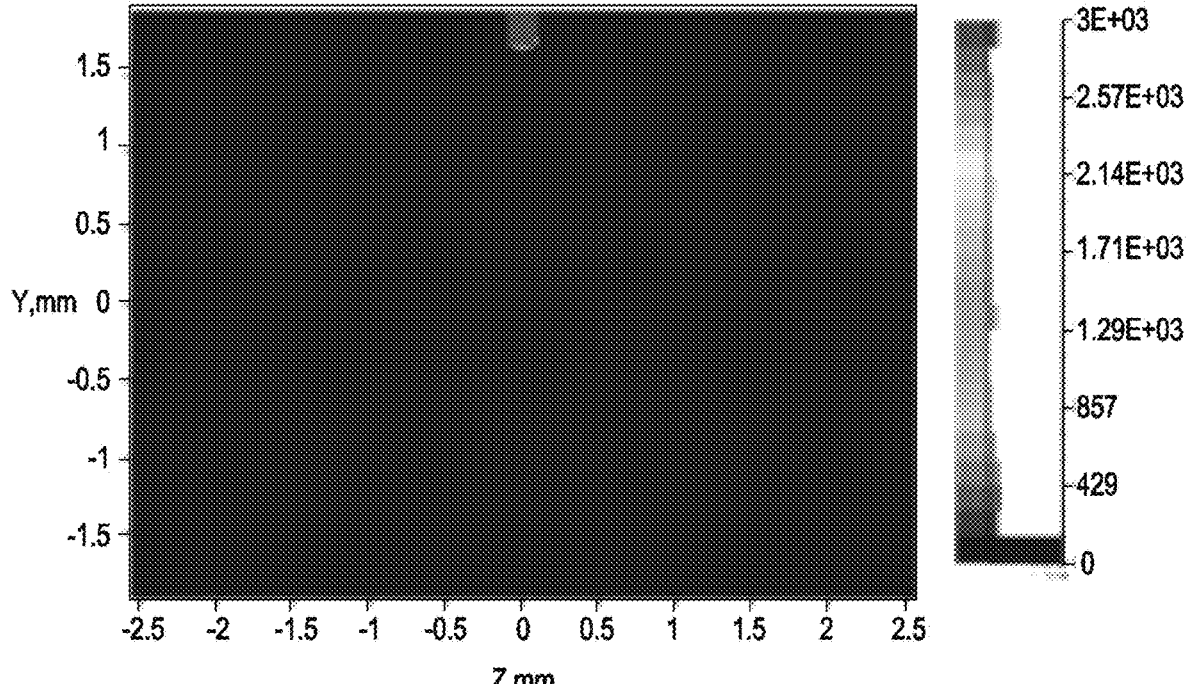
FIG. 8 is a view illustrating simulation results of performing light path tracking when light is incident on a camera module according to the embodiment of FIG. 7.

FIG. 7 is a view illustrating a camera module including a reflective and refractive member having a first cutting plane 305 according to an embodiment of the disclosure. FIG. 8 is a view illustrating simulation results of performing light path tracking when light is incident on a camera module according to the embodiment of FIG. 7.

Referring to FIG. 7, a reflective and refractive member 300 in which a first cutting plane 305 inclined with respect to the incident surface 301 and a first reflective surface 302 (or inclined with respect to an optical axis O-I) and a second cutting plane 306 parallel to the optical axis O-I are formed is disclosed. In the embodiment of FIG. 7, the first cutting plane 305 may face in a direction between the +Y axis and the +X axis (the first direction D1), and the second cutting plane 306 may face in a direction parallel to the −Y axis. For example, in the embodiment of FIG. 8, the angle Ang_A1 between the optical axis O-I and the first cutting plane 305 is about 30 degrees, and the angle Ang_A2 between the optical axis and the second cutting plane 306 is about 0 degrees.

Unlike the embodiments of FIGS. 3 to 6, FIGS. 7 and 8 may illustrate that the stray light generated when light having an inclination angle of about 8 degrees with respect to the optical axis O-I is incident on the marginal portion of the lens group 200 that is the predetermined distance away from the optical axis O-I is detected through the light path tracking simulation.

Referring to FIG. 7, light incident on the lens group 200 may pass through the lens group 200 and then be incident on the incident surface 301 of the reflective and refractive member 300. The light incident through the incident surface 301 may be reflected at least twice inside the reflective and refractive member 300 and then emitted through the exit surface 304 to reach the image sensor IS. It may be identified that an amount of stray light generated is detected, although the amount of stray light generated in the embodiment of FIG. 7 is reduced as compared to the embodiment of FIG. 3.

Referring to FIG. 8, even when the angle Ang_A1 between the optical axis O-I and the first cutting plane 305 of the reflective and refractive member 300 is 30 degrees and the angle Ang_A2 between the optical axis O-I and the second cutting plane 306 is 0 degrees, it may be identified that the stray light is not completely removed and a small amount of stray light may be detected according to the angle between the light incident on the lens group and the optical axis O-I.

Figure 9:
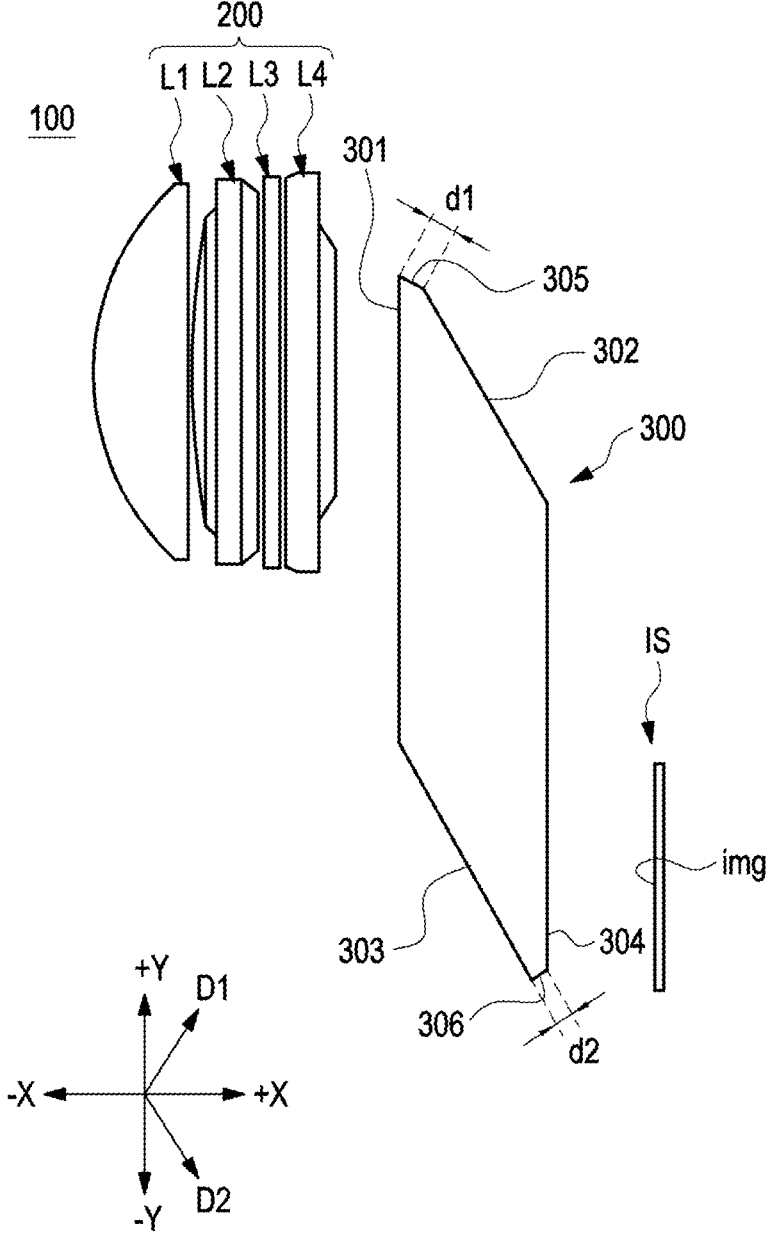
FIG. 9 is a view illustrating a camera module including a reflective and refractive member having a first cutting plane and a second cutting plane, according to an embodiment.
Figure 10:
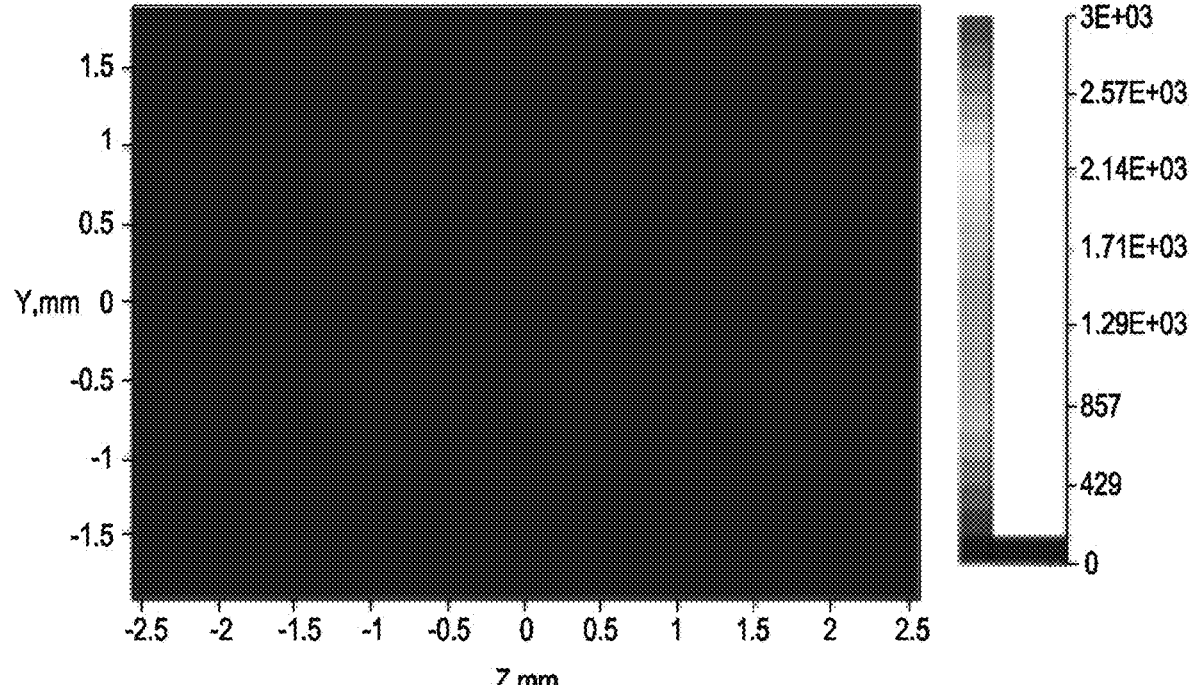
FIG. 10 is a view illustrating simulation results of performing light path tracking when light is incident on a camera module according to the embodiment of FIG. 9.

FIG. 9 is a view illustrating a camera module including a reflective and refractive member having a first cutting plane and a second cutting plane according to an embodiment of the disclosure. FIG. 10 is a view illustrating simulation results of performing light path tracking when light is incident on a camera module according to the embodiment of FIG. 9.

Referring to FIG. 9, the reflective and refractive member 300 having the first cutting plane 305 inclined with respect to the incident surface 301 and the first reflective surface 302 (or inclined with respect to the optical axis O-I) and the second cutting plane 306 inclined with respect to the exit surface 304 and the second reflective surface 303 (or inclined with respect to the optical axis O-I) is disclosed. In the embodiment of FIG. 9, the first cutting plane 305 may face in a direction (the first direction D1) between the +Y axis and the +X axis, and the second cutting plane 306 may face in a direction (the second direction D2) between the −Y axis and the −X axis. Here, the first cutting plane 305 and the second cutting plane 306 may be inclined in opposite directions with respect to the optical axis O-I. For example, in the embodiment of FIG. 9, the angle Ang_A1 between the optical axis and the first cutting plane 305 is about 30 degrees, and the angle Ang_A2 between the optical axis and the second cutting plane 306 is about −30 degrees.

Like the embodiment of FIGS. 7 and 8, FIGS. 9 and 10 may show that stray light generated when light having an inclination angle of about 8 degrees with respect to the optical axis is incident on the marginal portion of the lens group 200 that is the predetermined distance away from the optical axis O-I is detected through light path tracking simulation.

The light incident on the lens group 200 may pass through the lens group 200 and then be incident on the incident surface 301 of the reflective and refractive member 300. The light incident through the incident surface 301 may be reflected at least twice inside the reflective and refractive member 300 and then emitted through the exit surface 304 to reach the image sensor IS. Referring to FIG. 10, it may be identified that, unlike the embodiment of FIG. 8, no stray light reaching the image sensor IS is detected.

Referring to FIG. 10, when the angle Ang_A1 between the optical axis O-I and the first cutting plane 305 of the reflective and refractive member 300 is about 30 degrees and the angle Ang_A2 between the optical axis O-I and the second cutting plane 306 is about −30 degrees, it may be identified that no stray light reaching the image sensor IS is detected.

As described above, in the embodiment (e.g., the first embodiment) of FIGS. 1 to 10, the camera module 100 including the reflective and refractive member 300 having the first cutting plane 305 inclined with respect to the optical axis O-I and the second cutting plane 306 inclined with respect to the optical axis O-I may effectively reduce or prevent the generation of stray light (or flare) with respect to light incident close to the optical axis O-I.

Regarding the cross-sectional length of the cutting plane of the reflective and refractive member 300, according to an embodiment of the disclosure, the cross-sectional length d1 (distance 1) of the first cutting plane 305 and/or the cross-sectional length d2 (distance 2) of the second cutting plane 306 may be set to have a predetermined range in order to reduce or prevent the generation of stray light (or to reduce or prevent the generation of flare).

For example, the cross-sectional length d1 of the first cutting plane 305 and/or the cross-sectional length d2 of the second cutting plane 306 may be formed to have a length of 0.1 mm to 1.0 mm.

According to another embodiment, the cross-sectional length d1 of the first cutting plane 305 of the reflective and refractive member 300 and/or the cross-sectional length d2 of the second cutting plane 306 may be formed to have a length satisfying a predetermined range relative to the effective image height of the image sensor IS. For example, the electronic device including the reflective and refractive member 300 may satisfy formula 6 and formula 7 below to reduce or prevent the generation of stray light (or to reduce or prevent the generation of flare).

$$(0.04 \times IH) < d1 < (0.20 \times IH) \qquad \text{[Formula 6]}$$

$$(0.04 \times IH) < d2 < (0.20 \times IH) \qquad \text{[Formula 7]}$$

Here, d1 of formula 6 may be the cross-sectional length of the first cutting plane 305, d2 of formula 7 may be the cross-sectional length of the second cutting plane 306, IH may be the effective image height of the image sensor IS, and the 'effective image height' may mean half of the diagonal length of the image sensor IS. For example, as illustrated in FIGS. 4, 6, 8, and 10, the effective image height of the image sensor IS according to an embodiment may be about 3 mm. When the effective image height of the image sensor IS is 3 mm, each of the cross-sectional length d1 of the first cutting plane 305 of the reflective and refractive member 300 and the cross-sectional length d2 of the second cutting plane 306 may have a range of 0.12 mm to 0.6 mm, which may be advantageous for reducing or preventing light. According to an embodiment, the cross-sectional length d1 of the first cutting plane 305 and the cross-sectional length d2 of the second cutting plane 306 may have different lengths. For example, FIG. 10 illustrates simulation results when the cross-sectional length d1 of the first cutting plane 305 is about 0.54 mm and the cross-sectional length d2 of the second cutting plane 306 is about 0.26 mm in FIG. 9. In the embodiment (first embodiment) of FIGS. 1 to 10, the cross-sectional length d1 of the first cutting plane 305 may be longer than the cross-sectional length d2 of the second cutting plane 306, and may have an optimal effect of reducing or preventing light.

Figure 11:
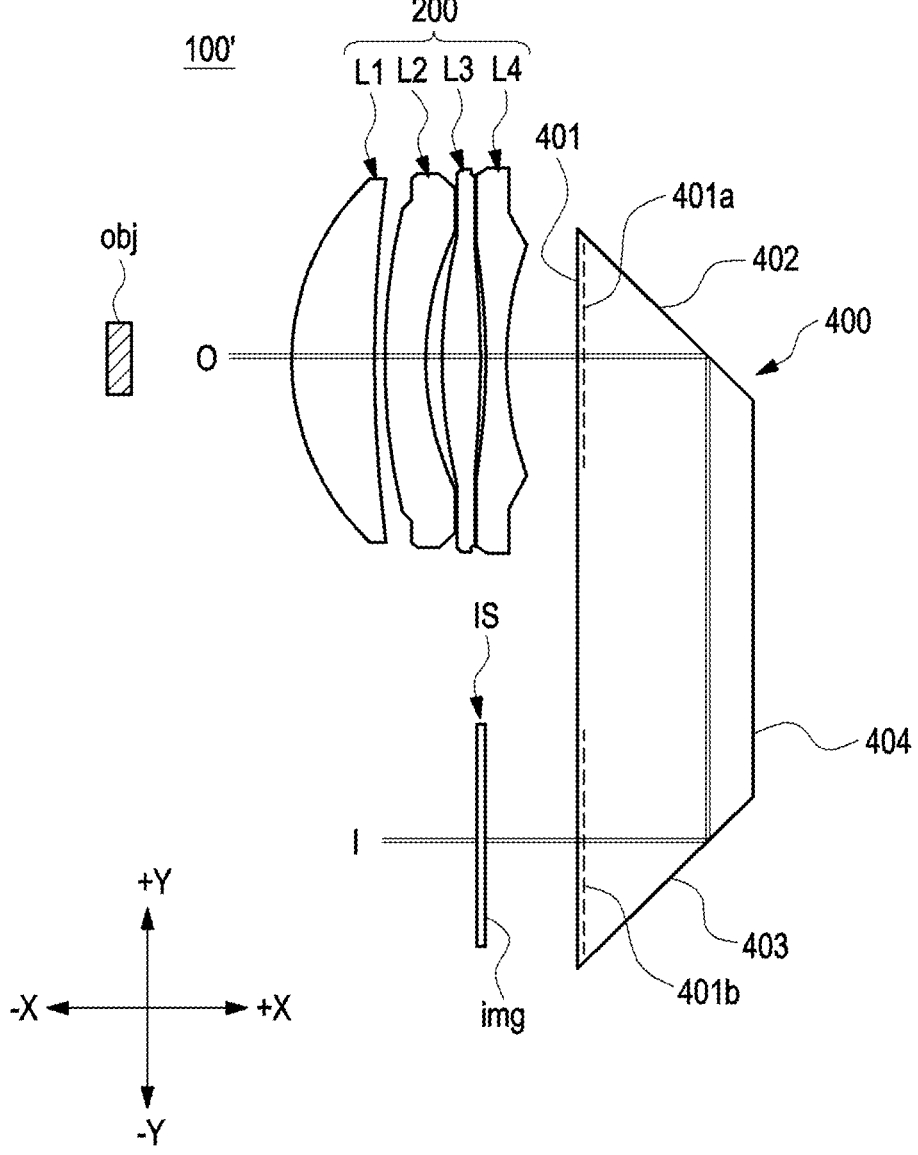
FIG. 11 is a view illustrating a camera module including a reflective and refractive member, according to an embodiment.
Figure 12A:
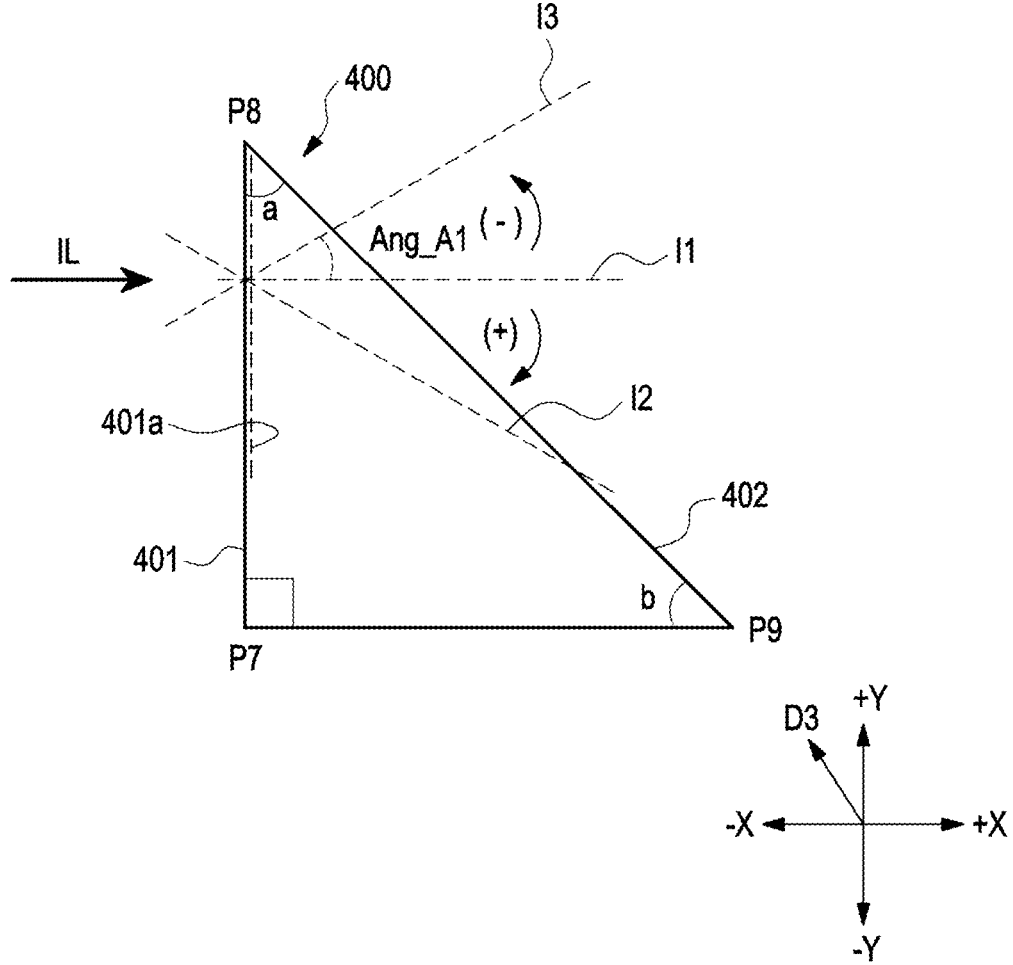
FIG. 12A is an enlarged view illustrating a vertex portion between a first surface and first reflective surface of a reflective and refractive member, according to an embodiment.
Figure 12B:
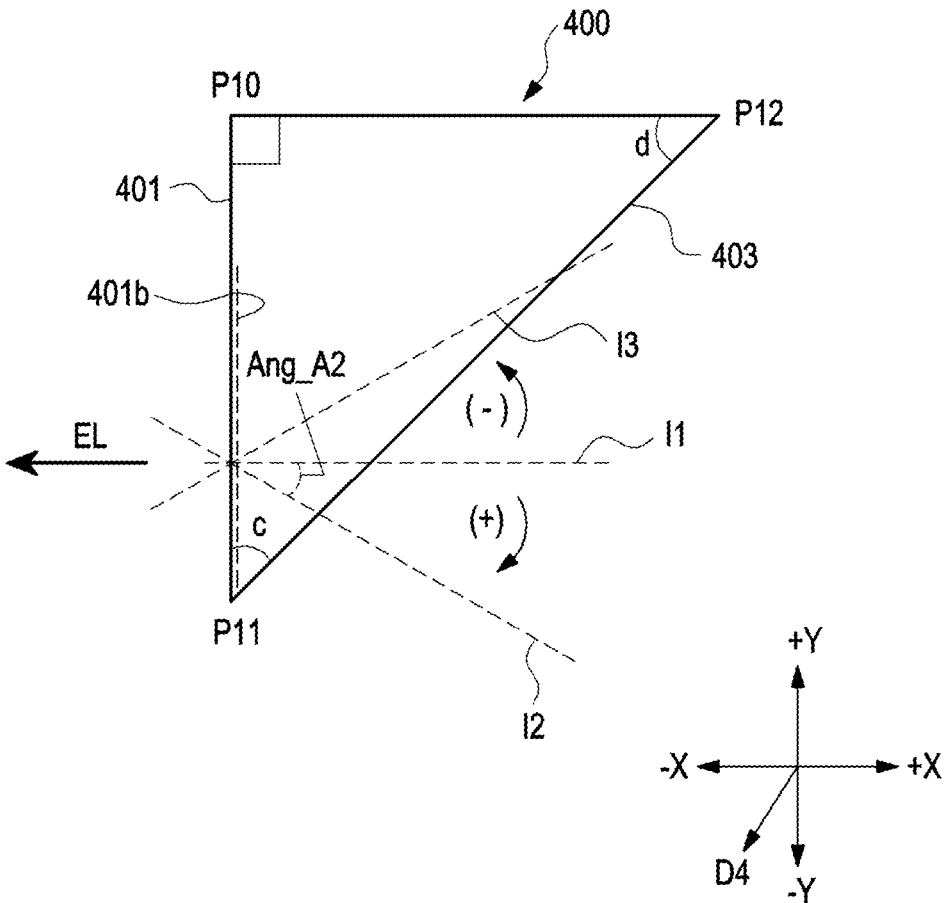
FIG. 12B is an enlarged view illustrating a vertex portion between a first surface and second reflective surface of a reflective and refractive member, according to an embodiment.
Figure 13:
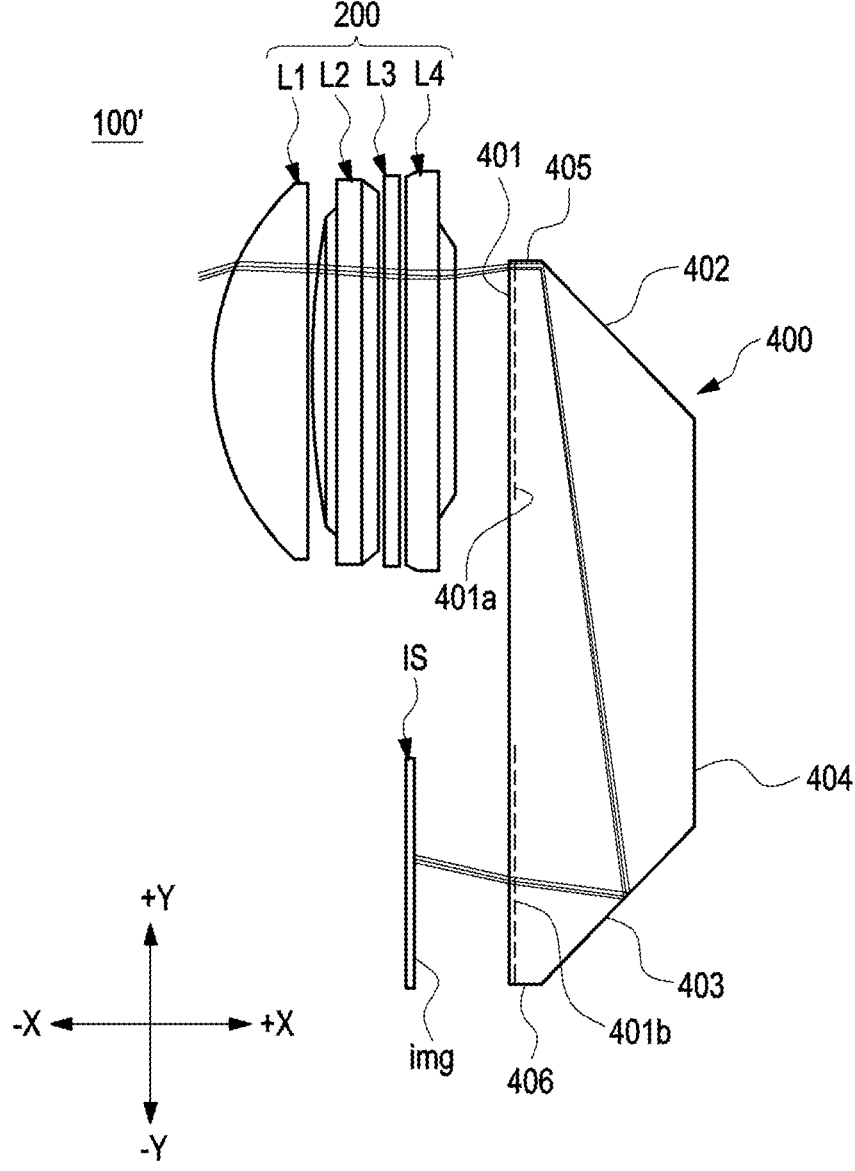
FIG. 13 is a view illustrating a camera module including a reflective and refractive member having a cutting plane parallel to an optical axis, according to an embodiment.
Figure 14:
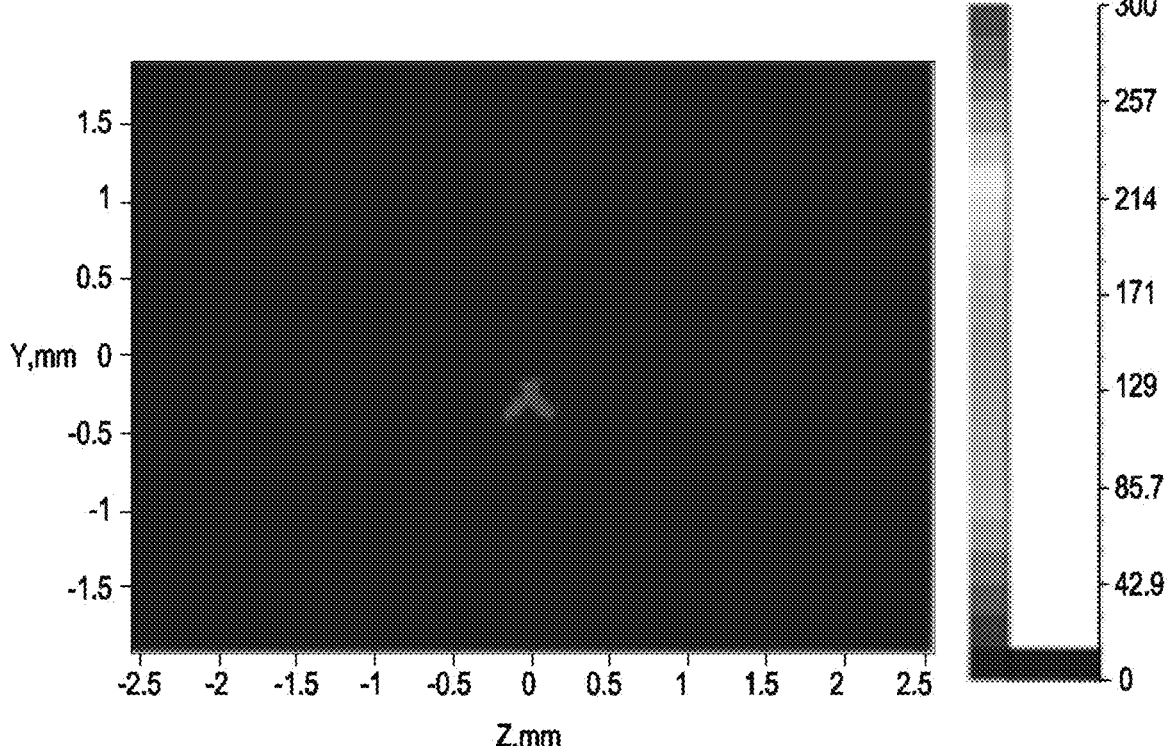
FIG. 14 is a view illustrating simulation results of performing light path tracking when light is incident on a camera module according to the embodiment of FIG. 13.

FIG. 11 is a view illustrating a camera module 100 including a reflective and refractive member 400 according to an embodiment of the disclosure. FIG. 12A is an enlarged view illustrating a vertex portion between an incident portion 401*a* of a first surface 401 of a reflective and refractive member 400 and a first reflective surface 402. FIG. 12B is an enlarged view illustrating a vertex portion between an exit portion 401*b* of a first surface 401 of a reflective and refractive member 400 and a second reflective surface 403. FIG. 13 is a view illustrating a camera module 100 including a first cutting plane 405 and a second cutting plane 406 parallel to an optical axis according to an embodiment of the disclosure. FIG. 14 is a diagram illustrating simulation results according to performing light path tracking when light is incident on the camera module 100, according to an embodiment of the disclosure.

Hereinafter, in the detailed description of the drawings (e.g., FIGS. 11 to 20), no description is given of the same components as those of the camera module 100 described above with reference to FIGS. 1 to 10. The camera module 100' of FIGS. 11 to 20 may include and/or may be similar in many respects to the camera module 100 described above with reference to FIGS. 1 to 10, and may include additional features not mentioned above. Furthermore, reflective and refractive member 400 of FIGS. 11 to 20 may include and/or may be similar in many respects to reflective and refractive member 300 of FIGS. 1 to 10, and may include additional features not mentioned above. The camera module 100' illustrated in FIG. 11 is a tele camera including a lens group 200 including at least one lens(s) and an image sensor IS, and may be formed as a folded optical lens system (a curved optical lens system) configured to bend at least twice along the traveling direction of light. The embodiments illustrated in FIGS. 11 to 20 may also be referred to as a folded camera. The folded camera may include a reflective and refractive member 400 capable of reflecting and/or refracting the traveling direction of light at least twice between the lens group 200 including at least one lens and the image sensor IS so as to bend the traveling direction of light at least twice.

The image sensor IS may be configured to detect light reflected and/or refracted by the reflective and refractive member 400 and incident on the imaging plane img. For example, light incident from the outside of the camera module 100' may be detected by the image sensor IS via the lens group 200 and the reflective and refractive member 400, and the electronic device may obtain an object image based on a signal and/or information detected through the image sensor IS.

According to an embodiment, the reflective and refractive member 400 may be disposed between the lens group 200 and the image sensor IS. That the reflective and refractive member 400 is disposed between the lens group 200 and the image sensor IS may include that the reflective and refractive member 400 is disposed between light paths on the optical axis O-I formed when the lens group 200 and the image sensor IS are aligned. The light incident on the lens group 200 from the outside may be reflected at least twice through the reflective and refractive member 400 and may be focused or aligned with the image sensor IS. Accordingly, the optical lens system from the lens group 200 to the image sensor IS may be downsized.

The reflective and refractive member 400 may include a prism, a mirror that transmits light, a mirror that reflects light, and/or an opening. For example, the reflective and refractive member 400 may be provided with a prism on one side and a mirror reflecting light on the other side. Further, the reflective and refractive member 400 may be configured such that at least two surfaces thereof are formed of prisms to reflect and/or refract light. According to an embodiment, the reflective and refractive member 400 may be formed by a combination of a plurality of prisms and/or mirrors. According to an embodiment, the reflective and refractive member 400 may be formed by combining a plurality of prism pieces and/or mirror pieces. For example, the reflective and refractive member 400 may be formed by combining prism pieces having a triangular and/or rectangular cross section and/or mirror pieces to form one reflective and refractive member 400, as shown in FIG. 11.

Referring to FIG. 11, the reflective and refractive member 400 may include a first surface 401, a fourth surface 404 substantially parallel to the first surface 401, a first reflective surface 402 connected to one edge of the first surface 401 and inclined with respect to the first surface 401 and the fourth surface 404, and a second reflective surface 403 connected to the other edge of the first surface 401 and inclined with respect to the first surface 401 and the fourth surface 404. The first surface 401 may be referred to as an incident surface (e.g., the incident surface 401 of FIG. 1) where light is incident. However, unlike the embodiments of FIGS. 1 to 10, in the embodiment of FIG. 11, light may not be emitted through the fourth surface 404 facing the first surface 401, and light may be emitted through the first surface 401 to which the light is incident.

Referring to FIGS. 11 to 12B, light IL passing through the lens group 200 may be incident through a portion 401*a* (or an incident portion 401*a*) of the first surface 401, and light EL reflected from the second reflective surface 403 may be emitted through another portion 401*b* (or an exit portion 401*b*) of the first surface 401. According to an embodiment, the reflective and refractive member 400 may have a shape in which the first surface 401 and the fourth surface 404 are substantially parallel, and the first reflective surface 402 and the second reflective surface 403 are not parallel. According to an embodiment, the reflective and refractive member 400 may have a trapezoidal cross-sectional shape. According to an embodiment, the first surface 401 and the fourth surface 404 may face in opposite directions, and the first reflective surface 402 and the second reflective surface 403 may face in different directions. In this case, the first surface 401 may be expressed as being inclined in the same direction as the fourth surface 404, and the first reflective surface 402 may be expressed as being inclined in a different direction from the second reflective surface 403. In the embodiment of FIGS. 11 to 12B, for the light passing through the reflective and refractive member 400, the direction in which the light is incident and the direction in which the light is emitted may face in opposite directions with respect to the light traveling along the optical axis O-I.

Referring to FIG. 12A, the first reflective surface 402 may be formed to be inclined with respect to the first surface 401. When the cross section of the edge portion of the reflective and refractive member 400 is enlarged, the reflective and refractive member 400 may be conceptually represented as a triangle having three vertices P7, P8, and P9. The light IL passing through the lens group 200 may pass through the incident portion 401*a* of the first surface 401 and proceed into the reflective and refractive member 400. Here, the vertex P8 may be a vertex between the first reflective surface 402 and the first surface 401. For example, the inclination angle α between the first reflective surface 402 and the first surface 401 formed at the vertex P8 may be set to vary according to an embodiment. Among the three vertices P7, P8, and P9, the vertex P7 may have a value of about 90 degrees, and the inclination angle b at the vertex P9 may be set to a value that may be automatically determined when the inclination angle α at the vertex P8 is designated. As is described later in detail, the reflective and refractive member 400 according to an embodiment of the disclosure may be formed with a cutting plane for reducing and/or preventing stray light, and as illustrated in FIG. 12A, the cutting plane positioned on the side of the incident portion 401*a* of the first surface 401 may face in the third direction D3 (direction 3).

Referring to FIG. 12B, when the cross section of another edge portion of the reflective and refractive member 400 is enlarged, the reflective and refractive member 400 may be conceptually represented as the triangle having three vertices P10, P11, and P12. Here, the vertex P11 may be a vertex between the second reflective surface 403 and the exit portion 401*b* of the first surface 401. For example, the inclination angle c between the second reflective surface 403 and the first surface 401 formed at the vertex P11 may be set to vary according to an embodiment. Among the three vertices P10, P11, and P12, the vertex P10 may have a value of about 90 degrees, and the inclination angle d at the vertex P12 may be set to a value that may be automatically determined when the inclination angle c at the vertex P11 is designated. As is described later in detail, the reflective and refractive member 400, according to an embodiment of the disclosure, may have a cutting plane for reducing and/or preventing stray light, and as illustrated in FIG. 12B, the cutting plane positioned on the exit portion 401*b* of the first surface 401 may face In a fourth direction D4 (direction 4). According to an embodiment of the disclosure, the reflective and refractive member 400 may have a first cutting plane (the first cutting plane 405 of FIG. 19 described below) inclined with respect to the first surface 401 and the first reflective surface 402 at an edge of the first reflective surface 402 and a second cutting plane (the second cutting plane 406 of FIG. 19 described below) inclined with respect to the first surface 401 and the second reflective surface 403 at an edge of the second reflective surface 403.

Referring to FIGS. 12A and 12B together, the first cutting plane 405 may be formed to face in the third direction (e.g., D3 of FIG. 12A), and the second cutting plane 406 may be formed to face in a direction different from the third direction. For example, the second cutting plane 406 may be formed to face in the fourth direction (e.g., D4 of FIG. 12B) different from the third direction. The reflective and refractive member 400 of the disclosure may include the first cutting plane 405 and the second cutting plane 406, thereby reducing or preventing the generation of stray light (or reducing or preventing the generation of flare). According to an embodiment, the first cutting plane 405 may be a cross section cut along the third virtual line 13 drawn to have a predetermined angle counterclockwise (—) from a point on the first virtual line 11 parallel to the optical axis O-I or the optical axis O-I. The first cutting plane 405 may be the cross section cut in the traveling direction and an inclined direction of light parallel to the optical axis O-I. According to an embodiment, the second cutting plane 406 may be a cross section cut along the second virtual line 12 drawn to have a predetermined angle in the clockwise direction (+) from a point on the first virtual line 11 parallel to the optical axis O-I or the optical axis O-I. The second cutting plane 406 may be the cross section cut in the traveling direction and an inclined direction of light parallel to the optical axis O-I.

In an embodiment (second embodiment), the first cutting plane 405 and the second cutting plane 406 may be formed to be inclined to opposite sides with respect to the optical axis O-I. For example, the first cutting plane 405 may be formed to form a predetermined angle from the optical axis O-I in the counterclockwise direction (—), and the second cutting plane 406 may be formed to form a predetermined angle form the optical axis O-I in the clockwise direction (+). When the first cutting plane 405 and the second cutting plane 406 face in the same direction (e.g., clockwise (+) or counterclockwise (—)) with respect to the optical axis O-I, the light path through which the stray light travels in the inner space of the reflective and refractive member 400 is not reduced or removed but is present, and in some cases, another light path may be formed. The reflective and refractive member 400 of the disclosure may include the first cutting plane 405 and the second cutting plane 406 inclined to opposite sides with respect to the optical axis O-I as described above, thereby reducing or preventing the generation of stray light (or reducing or preventing the generation of flare).

According to an embodiment, the camera module 100' including the reflective and refractive member 400 may satisfy Formula 1 and/or Formula 2 below to reduce or prevent the occurrence of stray light (or to reduce or prevent the occurrence of flare).

$$5 < |Ang\_A1| < 50 \qquad \text{[Formula 1]}$$

$$5 < |Ang\_A2| < 50 \qquad \text{[Formula 2]}$$

Here, Ang_A1 of formula 1 may be the angle between the optical axis O-I and the first cutting plane 405, and Ang_A2 of formula 2 may be the angle between the optical axis O-I and the second cutting plane 406. When the angle between the first cutting plane 405 and the second cutting plane 406 is smaller than the lower limit in Formulas 1 and 2, the possibility of occurrence of stray light (or flare) may increase, and the intensity thereof may also increase. Alternatively, when the angle between the first cutting plane 405 and the second cutting plane 406 is greater than the upper limit in Formulas 1 and 2, processing of the reflective and refractive member 400 may be difficult, and a new sharp angle may be formed by the processed surface (e.g., the first cutting plane 405 and the second cutting plane 406), making it difficult to handle the reflective and refractive member 400.

According to an embodiment, the camera module 100' including the reflective and refractive member 400 may satisfy Formula 3 below to reduce or prevent the generation of stray light (or to reduce or prevent the generation of flare).

$$-10 < Ang\_A1/Ang\_A2 < -0.1 \qquad \text{[Formula 3]}$$

Formula 3 may mean that the angle (e.g., Ang_A1 in FIG. 12A) between the optical axis O-I and the first cutting plane 405 and the angle (e.g., Ang_A2 in FIG. 12B) between the optical axis O-I and the second cutting plane 406 face in opposite directions. As described above, the disclosure may include the first cutting plane 405 and the second cutting plane 406 facing in opposite directions with respect to the optical axis O-I, thereby reducing or preventing the generation of stray light (or reducing or preventing the generation of flare).

According to an embodiment, in order to reduce or prevent the generation of stray light (or to reduce or prevent the generation of flare), at least one reflective surface of the first reflective surface 401 or the second reflective surface 403 may be formed to satisfy a condition of total reflection. For example, the reflective and refractive member 400 may satisfy formula 4 below.

$$25 < Vd\_1 < 95 \qquad \text{[Formula 4]}$$

Here, Vd_1 of formula 4 represents the variance value (or Abbe number) of the reflective and refractive member 400, which may be related to the refractive index of the reflective and refractive member 400. The reflective and refractive member 400 may be positioned between the lens group 200 and the imaging plane Img of the image sensor IS with respect to the optical axis O-I, which is a path through which light moves, thereby affecting aberration such as curvature and/or chromatic aberration. When the dispersion value of the reflective and refractive member 400 is greater than the upper limit value, it is advantageous to correct the chromatic aberration, but due to the soft material, it may be difficult to assemble the lens assembly and manage the process. On the other hand, when it becomes smaller than the lower limit of the reflective and refractive member 400, the overall properties of the material may be improved, but it may be difficult to control the chromatic aberration.

Further, e.g., the reflective and refractive member 400 may allow at least one of the first cutting plane 405 or the second cutting plane 406 to have an illuminance (roughness) capable of relatively reducing the reflectance of light passing through the at least one cutting plane. At least one of the first cutting plane 405 or the second cutting plane 406 may be corroded or black lacquered to obtain illuminance capable of relatively reducing the reflectance of light. Alternatively, by printing or depositing a coating layer on at least one of the first cutting plane 405 or the second cutting plane 406, an illuminance (roughness) capable of relatively reducing reflectance may be obtained.

According to an embodiment, the incident surface (e.g., the incident portion 401a or the exit portion 401b) of the reflective and refractive member 400 may block light of about 700 nm or more by about 80% or more, thereby blocking light (e.g., infrared rays) of visible light or light with a longer wavelength.

Meanwhile, according to an embodiment of the disclosure, the lens assembly including the lens group 200, the image sensor IS, and the reflective and refractive member 400 may satisfy formula 5 below.

$$5 < FOV < 35 \qquad \text{[Formula 5]}$$

Here, the FOV of formula 5 may be the field of view of the electronic device 101 including the lens assembly. The electronic device including the reflective and refractive member 400 of the disclosure may target a folded optical lens system. When the field of view of the electronic device including the lens assembly is about 35 degrees or more, the focal length reduces, and the distance between the image sensor IS and the lens group 200 decreases, making it difficult to dispose the reflective and refractive member 400. On the other hand, when it is about 5 degrees or less, the focal length may be too long, and the size of the entire optical lens system may increase.

Hereinafter, the first cutting plane 405 and the second cutting plane 406 are described in more detail with reference to FIGS. 13 to 20.

FIG. 13 is a view illustrating a camera module 100' including a reflective and refractive member 400 having a cutting plane 405 parallel to an optical axis according to an embodiment of the disclosure. FIG. 14 is a view illustrating simulation results of performing light path tracking when light is incident on a camera module 100' according to the embodiment of FIG. 13. FIG. 14 illustrates, e.g., an image sensor IS having a width (a length in the Z-axis direction) of about 5 mm and a length (a length in the Y-axis direction) of about 4 mm. In this case, the effective image height IH of the image sensor of FIG. 14 may be regarded as having a size of about 3 mm. Hereinafter, the embodiments of FIGS. 16, 18, and 20 may all show simulation results for the image sensor IS having the same type and size as those of FIG. 14.

Referring to FIG. 13, a reflective and refractive member 400 having a cutting plane parallel to the optical axis is disclosed. In the embodiment of FIG. 13, the first cutting plane 405 may face in, e.g., a direction parallel to the +Y axis, and the second cutting plane 406 may face in, e.g., a direction parallel to the −Y axis. For example, in the embodiment of FIG. 13, the angle Ang_A1 between the optical axis and the first cutting plane 405 is about 0 degrees, and the angle Ang_A2 between the optical axis and the second cutting plane 406 is about 0 degrees.

FIGS. 13 and 14 may illustrate that, e.g., stray light generated when light having an inclination angle of about −10 degrees with respect to the optical axis is incident on a marginal portion of the lens group 200 that is a predetermined distance away from the optical axis is detected through light path tracking simulation. For example, the simulation of FIG. 14 may show stray light formed on the image sensor IS. The image sensor IS may be disposed on a YZ plane or a plane parallel to the YZ plane, and in FIG. 14, the intensity of the light incident on the unit area of the image sensor IS may be expressed in mmlux (or 1 m/mm2)

Referring to FIG. 13, light incident on the lens group 200 may pass through the lens group 200 and then be incident through a portion 401*a* of the first surface 401 of the reflective and refractive member 400. The light incident through the portion 401*a* of the first surface 401 may be reflected at least twice or more inside the reflective and refractive member 400, then emitted again through the other portion 401*b* of the first surface 401, and may reach the image sensor IS spaced apart from the other portion 401*b* of the first surface 401 by a predetermined distance.

Referring to FIG. 14, when the angle Ang_A1 between the optical axis and the first cutting plane 405 is about 0 degrees and the angle Ang_A2 between the optical axis and the second cutting plane 406 is about 0 degrees, it may be identified that the stray light reaching the image sensor IS is detected.

Figure 15:
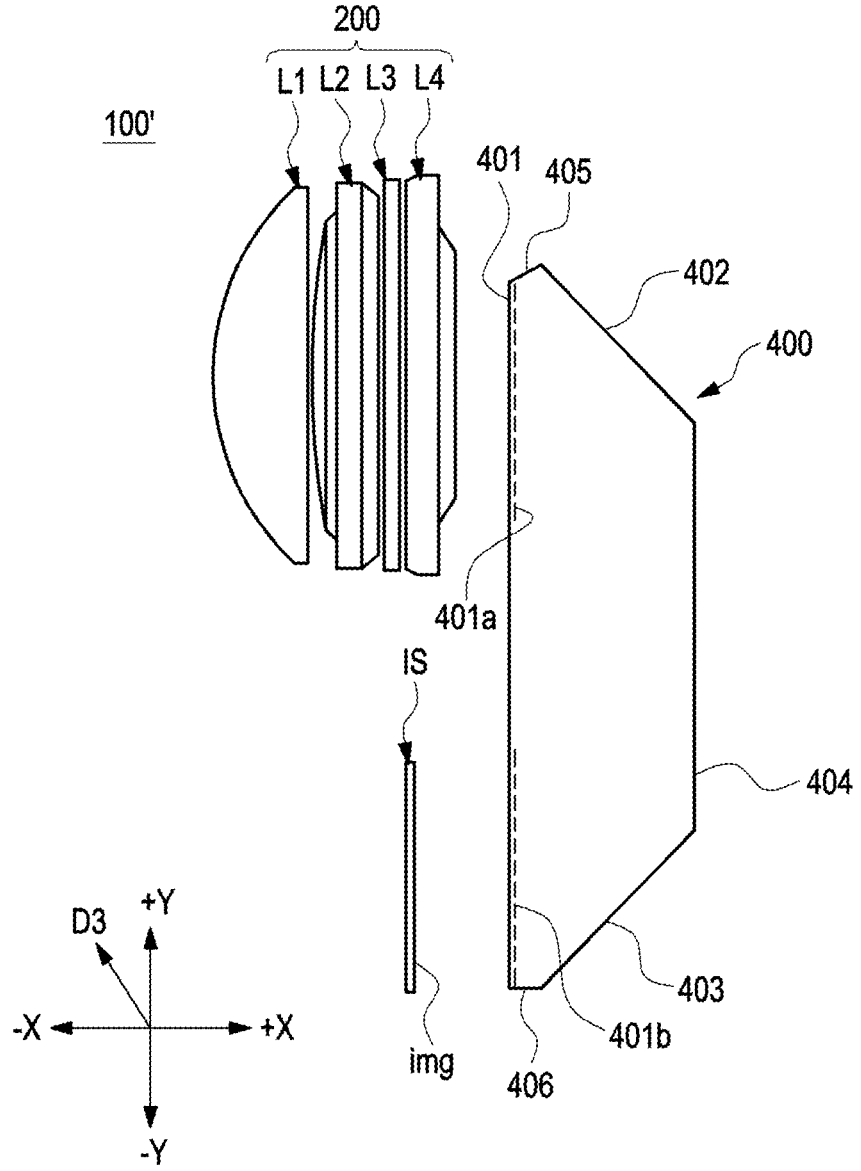
FIG. 15 is a view illustrating a camera module including a reflective and refractive member having a first cutting plane, according to an embodiment.
Figure 16:
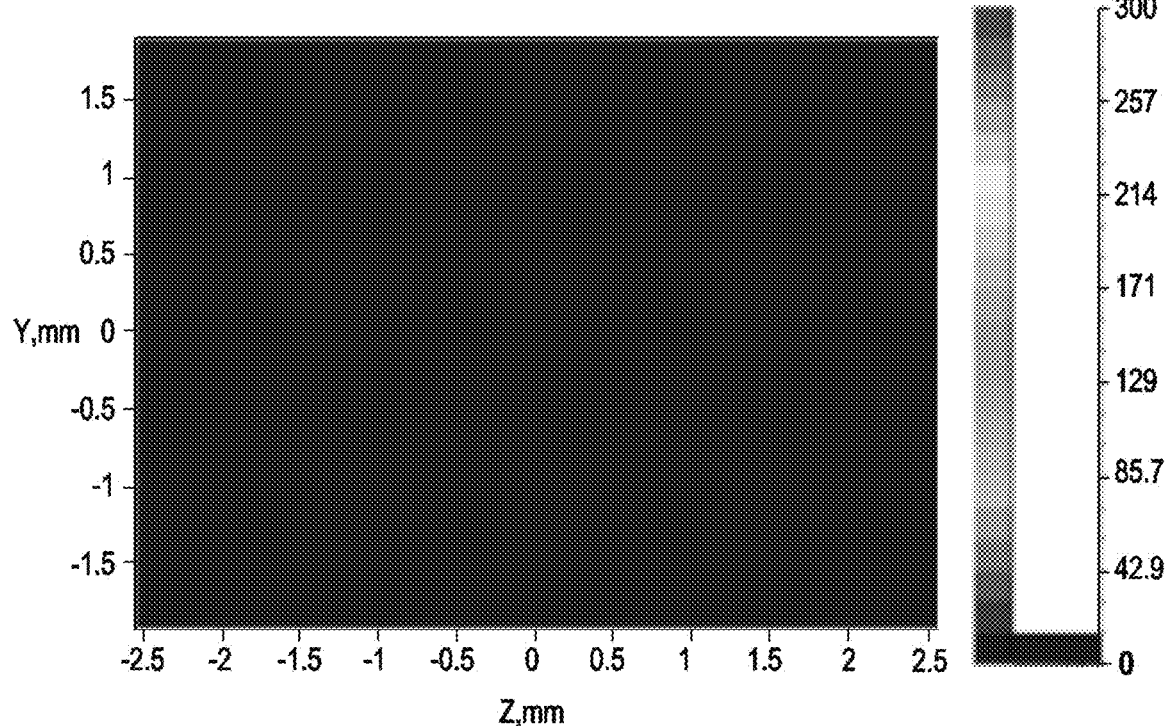
FIG. 16 is a view illustrating simulation results of performing light path tracking when light is incident on a camera module according to the embodiment of FIG. 15.

FIG. 15 is a view illustrating a camera module 100' including a reflective and refractive member 400 having a first cutting plane 405, according to an embodiment of the disclosure. FIG. 16 is a view illustrating simulation results of performing light path tracking when light is incident on a camera module 100' according to the embodiment of FIG. 15.

Referring to FIG. 15, a reflective and refractive member 400 having a first cutting plane 405 inclined with respect to the first surface 401 and the first reflective surface 402 (or inclined with respect to an optical axis) is disclosed. For example, in the embodiment of FIG. 16, the angle Ang_A1 between the optical axis O-I and the first cutting plane 405 is about −30 degrees, and the angle Ang_A2 between the optical axis and the second cutting plane 406 is about 0 degrees.

Like the embodiments of FIGS. 13 and 14, FIGS. 15 and 16 may show that the stray light generated when light having an inclination angle of about −10 degrees with respect to the optical axis is incident on the marginal portion of the lens group 200 spaced a predetermined distance from the optical axis is detected through light path tracking simulation.

The light incident on the lens group 200 may pass through the lens group 200 and then be incident on a portion 401*a* of the first surface 401 of the reflective and refractive member 400. The light incident through the first surface 401 may be reflected at least twice inside the reflective and refractive member 400 and then emitted through another portion 401*b* of the first surface 401 and reach the image sensor IS.

Referring to FIG. 16, it may be identified that, unlike the embodiment of FIG. 14, no stray light reaching the image sensor IS is detected.

Referring to FIG. 16, when the angle Ang_A1 between the optical axis and the first cutting plane 405 is about −30 degrees and the angle Ang_A2 between the optical axis and the second cutting plane 306 is about 0 degrees, it may be identified that no stray light reaching the image sensor IS is detected.

Figure 17:
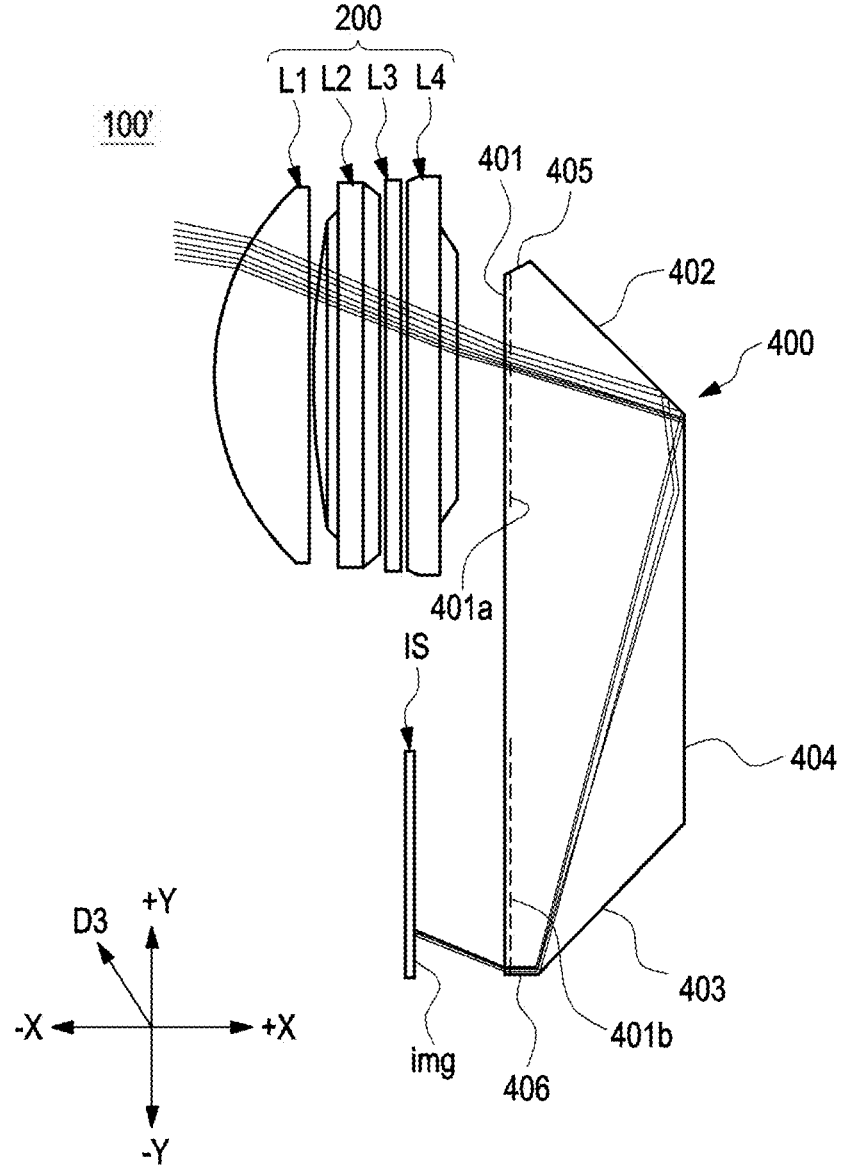
FIG. 17 is a view illustrating a camera module including a reflective and refractive member having a first cutting plane, according to an embodiment.
Figure 18:
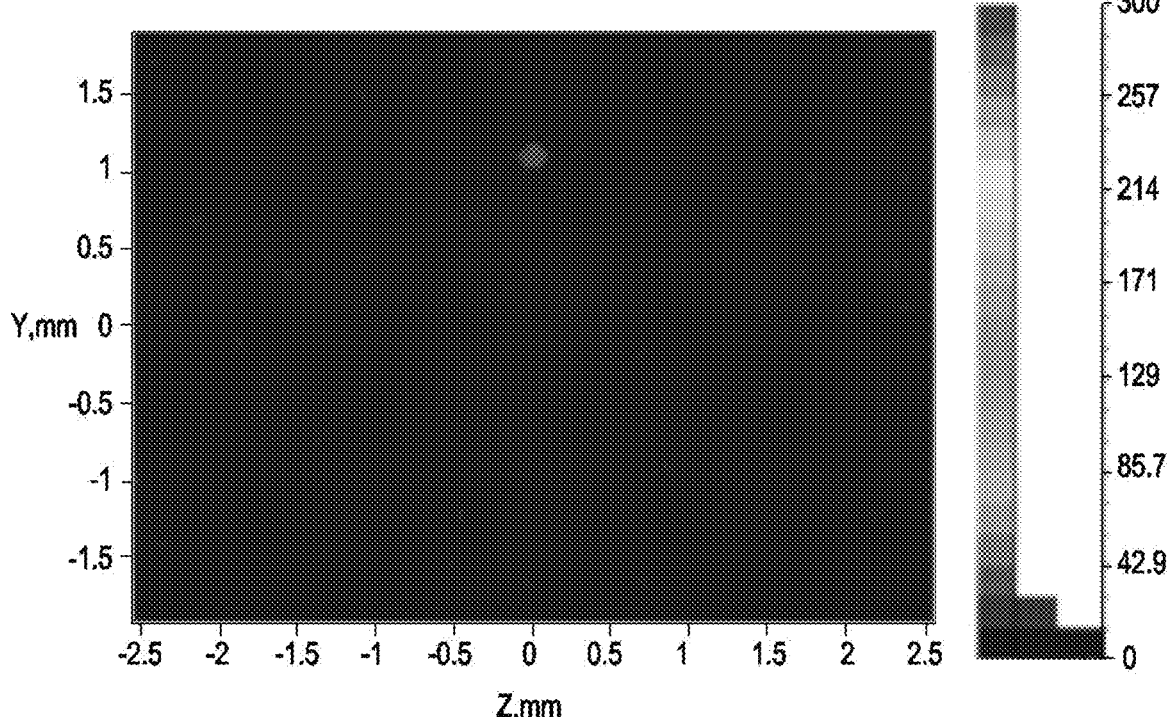
FIG. 18 is a view illustrating simulation results of performing light path tracking when light is incident on a camera module according to the embodiment of FIG. 17.

FIG. 17 is a view illustrating a camera module 100' including a reflective and refractive member 400 having a first cutting plane 405, according to an embodiment of the disclosure. FIG. 18 is a view illustrating simulation results of performing light path tracking when light is incident on a camera module 100' according to the embodiment of FIG. 17, according to an embodiment.

Referring to FIG. 17, a reflective and refractive member 400 having a first surface 401 and a first cutting plane 405 inclined with respect to the first reflective surface 402 (or inclined with respect to an optical axis) and a second cutting surface 406 is disclosed. For example, in the embodiment of FIG. 18, the angle Ang_A1 between the optical axis and the first cutting plane 405 is about −30 degrees, and the angle Ang_A2 between the optical axis and the second cutting plane 406 is about 0 degrees.

Unlike the embodiments of FIGS. 13 to 16, FIGS. 17 and 18 may show that the stray light generated when light having an inclination angle of about 8 degrees with respect to the optical axis is incident on the marginal portion of the lens group 200 spaced a predetermined distance from the optical axis is detected through light path tracking simulation.

Referring to FIG. 17, light incident on the lens group 200 may pass through the lens group 200 and then be incident on a portion 401*a* of the first surface 401 of the reflective and refractive member 400. The light incident through the first surface 401 may be reflected at least twice inside the reflective and refractive member 400 and then emitted through another portion 401*b* of the first surface 401 and reach the image sensor IS. Even in the embodiment of FIG. 17, it may be identified that a small amount of stray light is detected.

Referring to FIG. 18, when the angle Ang_A1 between the optical axis and the first cutting plane 405 is about −30 degrees and the angle Ang_A2 between the optical axis and the second cutting plane 406 is about 0 degrees, it may be identified that stray light is not removed but detected according to the angle between the optical axis O-I and the light incident on the lens group.

Figure 19:
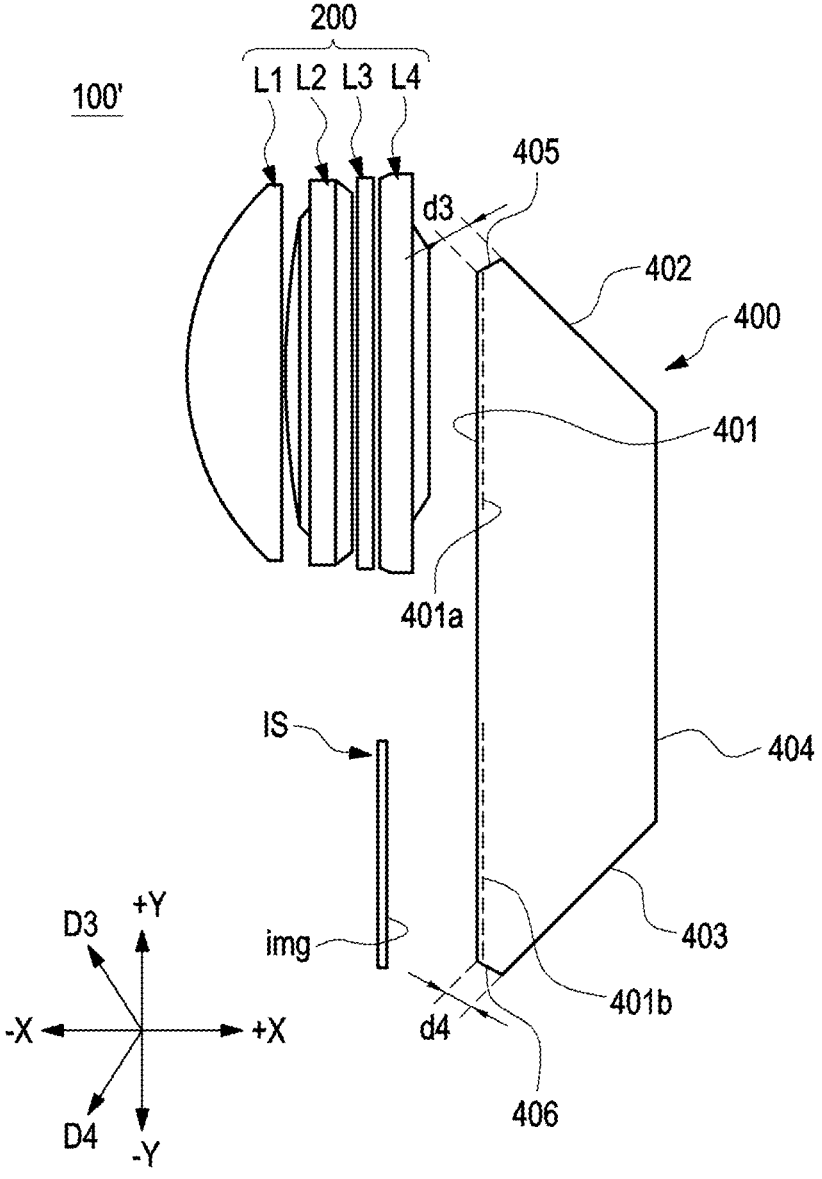
FIG. 19 is a view illustrating a camera module including a reflective and refractive member having a first cutting plane and a second cutting plane, according to an embodiment.
Figure 20:
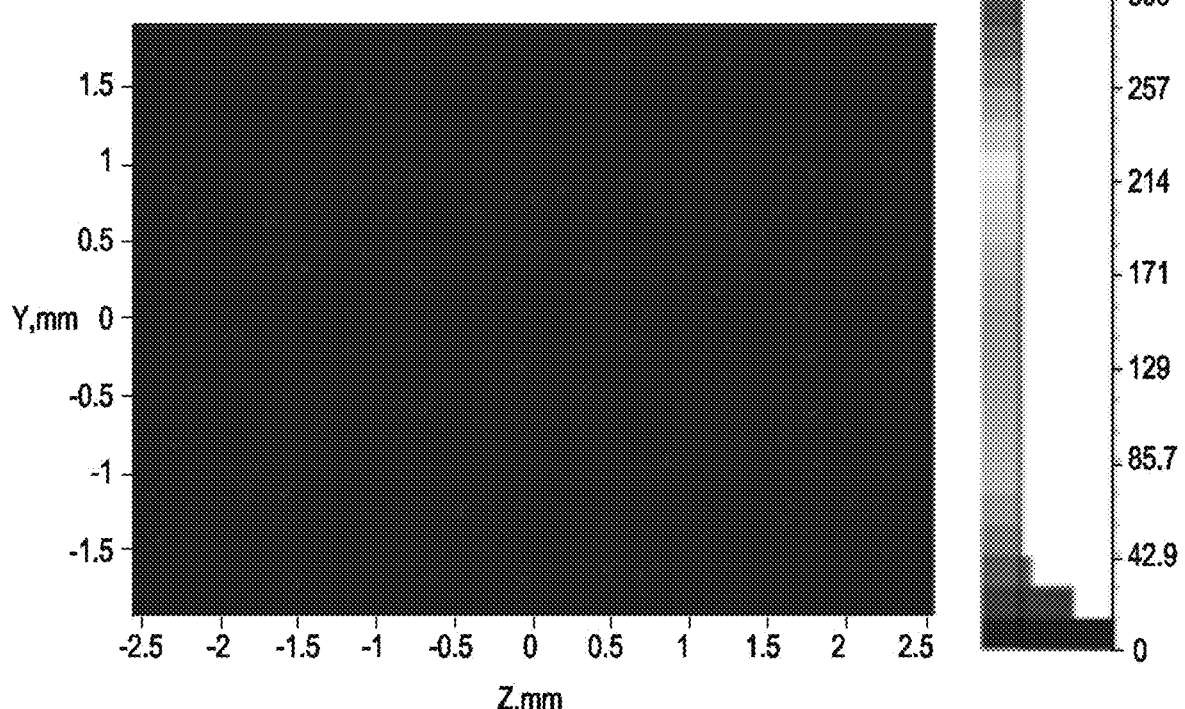
FIG. 20 is a view illustrating simulation results of performing light path tracking when light is incident on a camera module according to the embodiment of FIG. 19.

FIG. 19 is a view illustrating a camera module 100' including a reflective and refractive member 400 having a first cutting plane 405 and a second cutting plane 406, according to an embodiment of the disclosure. FIG. 20 is a view illustrating simulation results of performing light path tracking when light is incident on a camera module 100' according to the embodiment of FIG. 19.

Referring to FIG. 19, a reflective and refractive member 400 having a first cutting plane 405 inclined with respect to a portion 401*a* of the first surface 401 and the first reflective surface 402 (or inclined with respect to the optical axis) and a second cutting plane 406 inclined with respect to the first surface 401 and the second reflective surface 403 (or inclined with respect to the optical axis) is disclosed. For example, FIG. 20 illustrates an embodiment in which the angle Ang_A1 between the optical axis O-I and the first cutting plane 405 is about −30 degrees, and the angle Ang_A2 between the optical axis O-I and the second cutting plane 406 is about +30 degrees.

Like the embodiment of FIGS. 17 and 18, FIGS. 19 and 20 may show that the stray light generated when light having an inclination angle of about 8 degrees with respect to the optical axis O-I is incident on the marginal portion of the lens group 200 the predetermined distance away from the optical axis O-I is detected through the light path tracking simulation.

The light incident on the lens group 200 may pass through the lens group 200 and then be incident on a portion 401a of the first surface 401 of the reflective and refractive member 400. The light incident through the first surface 401 may be reflected at least twice inside the reflective and refractive member 400 and then emitted through another portion 401b of the first surface 401 and reach the image sensor IS. Referring to FIG. 19, it may be identified that, unlike the embodiment of FIG. 17, no detectable stray light may reach the image sensor IS.

Referring to FIG. 20, when the angle Ang_A1 between the optical axis O-I and the first cutting plane 305 is about –30 degrees and the angle Ang_A2 between the optical axis and the second cutting plane 306 is about +30 degrees, it may be identified that no stray light reaching the image sensor IS is detected.

As described above, in the embodiment (e.g., the second embodiment) of FIGS. 11 to 20, the camera module 100' including the reflective and refractive member 400 having the first cutting plane 405 and the second cutting plane 406 may effectively reduce and/or prevent the generation of stray light (and/or flare) with respect to light incident close to the optical axis.

Regarding the cross-sectional length of the cutting plane of the reflective and refractive member 400, according to an embodiment of the disclosure, the cross-sectional length d3 (distance 3) of the first cutting plane 405 and/or the cross-sectional length d4 (distance 4) of the second cutting plane 406 may be set to have a predetermined range in order to reduce or prevent the generation of stray light (or to reduce or prevent the generation of flare).

For example, the cross-sectional length d3 of the first cutting plane 405 and/or the cross-sectional length d4 of the second cutting plane 406 may be formed to have a length of 0.1 mm to 1.0 mm.

According to another embodiment, the cross-sectional length d3 of the first cutting plane 405 of the reflective and refractive member 400 and/or the cross-sectional length d4 of the second cutting plane 406 may be formed to have a length satisfying a predetermined range relative to the effective image height of the image sensor IS. For example, the electronic device including the reflective and refractive member 400 may satisfy formula 8 and formula 9 below to reduce or prevent the generation of stray light (or to reduce or prevent the generation of flare).

$$0.04 \times IH < d3 < 0.20 \times IH \qquad \text{[Formula 8]}$$

$$0.04 \times IH < d4 < 0.20 \times IH \qquad \text{[Formula 9]}$$

Here, d3 of formula 8 may be the cross-sectional length of the first cutting plane 405, d4 of formula 9 may be the cross-sectional length of the second cutting plane 406, IH may be the effective image height of the image sensor IS, and the 'effective image height' may mean half of the diagonal length of the image sensor IS. For example, as illustrated in FIGS. 14, 16, 18, and 20, the effective image height of the image sensor IS according to an embodiment may be about 3 mm. When the effective image height of the image sensor IS is 3 mm, each of the cross-sectional length d3 of the first cutting plane 405 of the reflective and refractive member 400 and the cross-sectional length d4 of the second cutting plane 406 may have a range of 0.12 mm to 0.6 mm, which may be advantageous for reducing or preventing light. According to an embodiment, the cross-sectional length d3 of the first cutting plane 405 and the cross-sectional length d4 of the second cutting plane 406 may have substantially the same length. For example, FIG. 20 illustrates simulation results when the cross-sectional length d3 of the first cutting plane 405 is about 0.42 mm and the cross-sectional length d4 of the second cutting plane 406 is about 0.38 mm in FIG. 19. In the embodiment (second embodiment) of FIGS. 11 to 20, the cross-sectional length d3 of the first cutting plane 405 may be substantially the same as the cross-sectional length d4 of the second cutting plane 406, and may have an optimal effect of reducing or preventing light.

The electronic device according to an embodiment of the disclosure may be one of various types of devices. The electronic devices may include, for example, a portable communication device (e.g., a smartphone), a computer device, a portable multimedia device, a portable medical device, a camera, a wearable device, or a home appliance. The electronic devices according to an embodiment are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in the form of an application-specific integrated circuit (ASIC).

An embodiment of the disclosure may be implemented as software (e.g., a program) including one or more instructions that may be stored in a storage medium (e.g., an internal memory, an external memory) that may be readable by a machine (e.g., the electronic device). For example, a processor of the machine (e.g., the electronic device) may invoke at least one of the one or more instructions stored in the storage medium, and execute it, with or without using one or more other components under the control of the processor. This may allow the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" may simply mean that the storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

According to an embodiment of the disclosure, an electronic device may comprise a lens group 200 including at least one lens, an image sensor IS aligned along an optical axis O-I from the lens group, and a reflective and refractive member 300 or 400 disposed between the lens group and the image sensor on the optical axis. The reflective and refractive member may include an incident surface 301 or 401 where light passing through the lens group is incident, a first reflective surface 302 or 402 inclined with respect to the incident surface, and a second reflective surface 303 or 403 formed to be inclined with respect to the incident surface and spaced apart from the first reflective surface. A first cutting plane 305 or 405 inclined with respect to the incident surface and the first reflective surface may be formed at an edge of the first reflective surface. A second cutting plane 306 or 406 inclined with respect to the incident surface and the second reflective surface may be formed at an edge of the second reflective surface. In this case, the first cutting plane may face in a first direction D1 or D3, and the second cutting plane may face in a second direction D2 or D4 different from the first direction.

According to an embodiment, the reflective and refractive member 300 may include a light exit surface 304 where the light passing through the reflective and refractive member is emitted, and the light exit surface 304 may be formed to be spaced apart from the incident surface 301.

According to an embodiment, the reflective and refractive member 300 may have a parallelogram cross-sectional shape in which the incident surface 301 and the exit surface 304 are parallel, and the first reflective surface 302 and the second reflective surface 303 are parallel.

According to an embodiment, the first cutting plane 305 may be a cross section cut along a second virtual line 12 drawn to have a predetermined angle in a clockwise direction (+) from one point on the optical axis or a first virtual line 11 parallel to the optical axis, and the second cutting plane 306 may be a cross section cut along a third virtual line 13 drawn to have a predetermined angle in a counterclockwise direction (—) from one point on the optical axis or the first virtual line 11 parallel to the optical axis.

According to an embodiment, in the reflective and refractive member 400, the light passing through the lens group may be incident through a portion 401a of the incident surface 401, and light reflected from the second reflective surface 403 may be emitted through another portion 401b of the incident surface 401.

According to an embodiment, the reflective and refractive member 400 may have a trapezoidal cross-sectional shape so that it includes a surface 404 parallel to the incident surface 401, and the first reflective surface 402 is not parallel to the second reflective surface 403.

According to an embodiment, the first cutting plane 405 may be a cross section cut along a third virtual line 13 drawn to have a predetermined angle in a counterclockwise direction (—) from one point on the optical axis or a first virtual line 11 parallel to the optical axis, and the second cutting plane 406 may be a cross section cut along a second virtual line 12 drawn to have a predetermined angle in a clockwise direction (+) from one point on the optical axis or the first virtual line 11 parallel to the optical axis.

According to an embodiment, the electronic device may meet formula 1 below.

$$5 < |Ang\_A1| < 50 \qquad \text{[Formula 1]}$$

(where Ang_A1 in formula 1 is an angle between the optical axis and the first cutting plane).

According to an embodiment, the electronic device may meet formula 2 below.

$$5 < |Ang\_A2| < 50 \qquad \text{[Formula 2]}$$

(where Ang_A2 in formula 2 is an angle between the optical axis and the second cutting plane).

According to an embodiment, the electronic device may meet formula 3 below.

$$-10 < Ang\_A1/Ang\_A2 < -0.1 \qquad \text{[Formula 3]}$$

(where Ang_A1 in formula 3 is an angle between the optical axis and the first cutting plane, and Ang_A2 in formula 3 is an angle between the optical axis and the second cutting plane).

According to an embodiment, at least one of the first reflective surface or the second reflective surface may meet a condition of total reflection.

According to an embodiment, the electronic device may meet formula 4 below.

$$25 < Vd\_1 < 95 \qquad \text{[Formula 4]}$$

(where Vd_1 in formula 4 is a dispersion value of the reflective and refractive member).

According to an embodiment, at least one of the first cutting plane or the second cutting plane may have a roughness capable of relatively decreasing a reflectance of light passing through the at least one cutting plane, or be coated or lacquered in black.

According to an embodiment, the electronic device may meet formula 5 below.

$$5 < FOV < 35 \qquad \text{[Formula 5]}$$

(where the FOV in formula 5 is a field of view of the electronic device 101 including the lens assembly).

According to an embodiment, there may be provided an electronic device in which the lens assembly including the lens group, the image sensor, and the reflective and refractive member forms a folded optical lens system in which a path of light incident on the lens group may be reflected or refracted at least twice, and an image stabilization function may be performed by moving or rotating the reflective and refractive member.

According to an embodiment of the disclosure, an electronic device may comprise a lens group 200 including at least one lens, an image sensor may be aligned along an optical axis O-I from the lens group, and at least one reflective and refractive member disposed between the lens group and the image sensor on the optical axis. The lens assembly including the lens group, the image sensor, and the reflective and refractive member may form a folded optical lens system in which a path of light incident on the lens group is reflected or refracted at least twice. Among the at least one reflective and refractive member, a reflective and refractive member 300 or 400 closest to an image side of the image sensor may include an incident surface 301 or 401 where light passing through the lens group may be incident, a first reflective surface 302 or 402 inclined with respect to the incident surface, and a second reflective surface 303 or 403 formed to be inclined with respect to the incident surface and spaced apart from the first reflective surface. A first cutting plane 305 or 405 inclined with respect to the incident surface and the first reflective surface may be formed at an edge of the first reflective surface. A second cutting plane 306 or 406 inclined with respect to the incident surface and the second reflective surface may be formed at an edge of the second reflective surface. In this case, the first cutting plane may face in a first direction D1 or D3, and the second cutting plane may face in a second direction D2 or D4 different from the first direction.

According to an embodiment, among the at least one reflective and refractive member, the reflective and refractive member 300 closest to the image side may include an incident surface 301 where light passing through the lens group is incident and an exit surface 304 where light reflected from the second reflective surface 303 is emitted, the exit surface 304 may be formed to be spaced apart from the incident surface 301 and has a parallelogram cross-sectional shape in which the incident surface 301 and the light exit surface 304 are parallel to each other, and the first reflective surface 302 and the second reflective surface 303 are parallel to each other.

According to an embodiment, among the at least one reflective and refractive member, the reflective and refractive member 400 closest to the image side may be configured so that the light passing through the lens group is incident through a portion 401a of the incident surface 401, and light reflected from the second reflective surface 403 is emitted through another portion 401b of the incident surface 401, and includes a surface 404 parallel to the incident surface 401, and the first reflective surface 402 is not parallel to the second reflective surface 403.

According to an embodiment, among the at least one reflective and refractive member, the reflective and refractive member 300 or 400 closest to the image side may meet formula 1 and formula 2 below, $$5 < |Ang\_A1| < 50 \qquad \text{[Formula 1]}$$

$$5 < |Ang\_A2| < 50 \qquad \text{[Formula 2]}$$

(where Ang_A1 in formula 1 is an angle between the optical axis and the first cutting plane, and Ang_A2 in formula 2 is an angle between the optical axis and the second cutting plane).

According to an embodiment, formula 3 below may be met, $$-10 < Ang\_A1/Ang\_A2 < -0.1 \qquad \text{[Formula 3]}$$

(where Ang_A1 in formula 3 is an angle between the optical axis and the first cutting plane, and Ang_A2 in formula 3 is an angle between the optical axis and the second cutting plane).

While certain example embodiments of the disclosure been shown and described, it will be apparent to those of ordinary skill in the art that various changes in form and detail may be made thereto without departing from the spirit and scope of the disclosure as defined by the following claims. For example, in specific embodiments of the disclosure, specific shapes or dimensions of the lenses, reflective and refractive members, and image sensors of the disclosure may be properly set depending on the structure, specifications, or actual use environment of the lens assembly as actually manufactured or an electronic device equipped with the lens assembly.

What is claimed is:

1. An electronic device comprising:
a camera module comprising at least one lens, an image sensor aligned along an optical axis from the at least one lens, and a reflective and refractive member disposed on the optical axis between the at least one lens and the image sensor,
wherein the reflective and refractive member comprises:
an incident surface that is perpendicular to the optical axis and on which light passing through the at least one lens is incident;
a first reflective surface inclined with respect to the incident surface; and
a second reflective surface inclined with respect to the incident surface and spaced apart from the first reflective surface;
an exit surface parallel to the incident surface;
a first cut side between the incident surface and the first reflective surface that is inclined at a first angle with respect to the optical axis and is formed at a first edge of the first reflective surface; and
a second cut side between the exit surface and the second reflective surface that is inclined at a second angle with respect to the optical axis and is formed at a second edge of the second reflective surface,
wherein the first cut side faces in a first direction,
wherein the second cut side faces in a second direction different from the first direction,
wherein the at least one of the first angle or the second angle is greater than zero (0) degrees and less than ninety (90) degrees, and wherein an absolute value of the first angle between the optical axis and the first cut side is greater than 5 degrees and less than 50 degrees.

2. The electronic device of claim 1, wherein the exit surface is spaced apart from the incident surface, wherein the first reflective surface and the second reflective surface are parallel to each other, and wherein the reflective and refractive member has a parallelogram cross-sectional shape.

3. The electronic device of claim 1, wherein the first cut side is a first cross section cut along a second virtual line having a first predetermined angle in a clockwise direction from a first point on a first virtual line parallel to the optical axis, and wherein the second cut side is a second cross section cut along a third virtual line having a second predetermined angle in a counterclockwise direction from a second point on the first virtual line parallel to the optical axis.

4. The electronic device of claim 1, wherein an absolute value of the second angle between the optical axis and the second cut side is greater than 5 degrees and less than 50 degrees.

5. The electronic device of claim 4, wherein a ratio between the first angle between the optical axis and the first cut side and the second angle between the optical axis and the second cut side is greater than −10 and less than −0.1.

6. The electronic device of claim 1, wherein at least one of the first reflective surface or the second reflective surface is configured to meet a total reflection condition.

7. The electronic device of claim 1, wherein the reflective and refractive member meets formula 4 below, $$25 < Vd\_1 < 95 \qquad \text{[Formula 4]}$$

wherein Vd_1 in formula 4 is an Abbe number of the reflective and refractive member.

8. The electronic device of claim 1, wherein at least one of the first cut side or the second cut side has a roughness capable of relatively decreasing a reflectance of light passing through the at least one of the first cut side and the second cut side, wherein the at least one of the first cut side or the second cut side is coated, or wherein the at least one of the first cut side or the second cut side is lacquered in black.

9. The electronic device of claim 1, wherein the camera module including the at least one lens, the image sensor, and the reflective and refractive member meets formula 5, $$5 \text{ degrees} < FOV < 35 \text{ degrees} \qquad \text{[Formula 5]}$$

wherein the FOV in formula 5 is a field of view of the electronic device including the camera module.

10. The electronic device of claim 9, wherein the camera module forms a folded optical lens system configured to reflect or refract a path of light incident on the at least one lens at least two times.

11. An electronic device comprising:

a camera module comprising at least one lens, an image sensor aligned along an optical axis from the at least one lens and at least one reflective and refractive member on the optical axis between the at least one lens and the image sensor, wherein the camera module forms a folded optical lens system in which a path of light incident on the at least one lens is reflected or refracted at least two times, wherein, among the at least one reflective and refractive member, a first reflective and refractive member closest to an image side of the image sensor comprises an incident surface that is perpendicular to the optical axis and where light passing through the at least one lens is incident, a first reflective surface that is inclined with respect to the incident surface, a second reflective surface that is inclined with respect to the incident surface and spaced apart from the first reflective surface, an exit surface parallel to the incident surface, a first cut side between the incident surface and the first reflective surface that is inclined at a first angle with respect to the optical axis and is formed at a first edge of the first reflective surface, and a second cut side between the exit surface and the second reflective surface that is inclined at a second angle with respect to the optical axis and is formed at a second edge of the second reflective surface, wherein the first cut side faces in a first direction, wherein the second cut side faces in a second direction different from the first direction, wherein the at least one of the first angle or the second angle is greater than zero (0) degrees and less than ninety (90) degrees, and wherein an absolute value of the first angle between the optical axis and the first cut side is greater than 5 degrees and less than 50 degrees.

12. The electronic device of claim 11, wherein the exit surface is spaced apart from the incident surface, wherein the first reflective surface and the second reflective surface are parallel to each other, wherein the first reflective and refractive member has a parallelogram cross-sectional shape.

13. The electronic device of claim 11, wherein an absolute value of the second angle between the optical axis and the second cut side is greater than 5 degrees and less than 50 degrees.

* * * * *